(12) United States Patent
Tragesser et al.

(10) Patent No.: US 8,052,395 B2
(45) Date of Patent: Nov. 8, 2011

(54) AIR COOLED BUCKET FOR A TURBINE

(75) Inventors: Daniel Tragesser, Simpsonville, SC (US); Ian Reeves, Easley, SC (US)

(73) Assignee: General Electric Company, Schenectady, NY (US)

( * ) Notice: Subject to any disclaimer, the term of this patent is extended or adjusted under 35 U.S.C. 154(b) by 770 days.

(21) Appl. No.: 12/122,388

(22) Filed: May 16, 2008

(65) Prior Publication Data

US 2009/0324424 A1    Dec. 31, 2009

Related U.S. Application Data

(60) Provisional application No. 60/976,226, filed on Sep. 28, 2007.

(51) Int. Cl.
*F01D 5/18* (2006.01)
*B64C 11/24* (2006.01)

(52) U.S. Cl. ......... 416/242; 416/243; 416/92; 416/96 R; 416/97 R (58) Field of Classification Search ............. 416/92, 416/97 R
See application file for complete search history.

(56) References Cited

U.S. PATENT DOCUMENTS

| | | | |
|---|---|---|---|
| 5,980,209 A | * | 11/1999 | Barry et al. ............ 416/223 A |
| 6,390,774 B1 | | 5/2002 | Lewis et al. |
| 6,418,804 B1 | | 7/2002 | Zabala et al. |
| 6,884,038 B2 | | 4/2005 | Hyde et al. |
| 6,910,864 B2 | * | 6/2005 | Tomberg ............... 416/90 R |
| 6,910,868 B2 | | 6/2005 | Hyde et al. |
| 7,207,775 B2 | | 4/2007 | Murrithi |
| 2006/0045741 A1 | | 3/2006 | Honkomp |

* cited by examiner

*Primary Examiner* — Edward Look
*Assistant Examiner* — Jason Davis
(74) *Attorney, Agent, or Firm* — Armstrong Teasdale LLP (57) ABSTRACT

A bucket for a turbine is provided. The bucket includes an airfoil having a root portion, a tip portion, an airfoil shape, and a nominal profile substantially in accordance with Cartesian coordinate values of X, Y, and Z set forth in Table I, wherein Z is a distance from a platform on which the airfoil extends outwardly from, and X and Y are coordinates defining the profile at each distance Z from the platform. The bucket also includes a plurality of cooling passages extending between the root portion and tip portion of the airfoil, each of the plurality of cooling passages exiting at the tip portion, the plurality of cooling passages positioned in a camber line pattern.

19 Claims, 6 Drawing Sheets

AIR COOLED BUCKET FOR A TURBINE

CROSS REFERENCE TO RELATED APPLICATIONS

This application claims the benefit of U.S. Provisional Patent Application Ser. No. 60/976,226, filed on Sep. 28, 2007 titled Turbine Bucket Airfoil Cooling Hole Location, Style, and Configuration.

BACKGROUND OF THE INVENTION

The field of this invention relates generally to turbine buckets and, more particularly, to a turbine bucket that includes a cooling circuit with cooling holes sized and positioned to facilitate optimizing cooling ability and turbine efficiency.

In known gas turbine engines, combustion gases cause rotation of a turbine which drives a compressor. The compressor supplies pressurized air to a combustor which generates the combustion gases. Because such engines operate at relatively high temperatures, the capacity of such an engine may be limited by the materials used in fabricating the turbine blades, sometimes referred to herein as "buckets." More specifically, higher temperatures may cause thermal stresses to develop within the blades which may limit their operation. Such stresses may be more severe in industrial gas turbine engines because of the relatively large size of the turbine blades.

Turbines are designed to operate at a predetermined temperature that facilitates a desired performance and efficiency. Typically, newer turbines are designed to operate at higher temperatures, which necessitates greater cooling of the blades than blades used in turbines operating at lower temperatures. After continued exposure to high temperatures, turbine blades may require replacement.

To enable the turbines to operate with higher operating temperatures and increased engine efficiency without risking blade failure, at least some turbines use hollow, convectively-cooled turbine blades. At least some of such blades include interior cooling passageways which provide cooling flow to the interior of the blades to facilitate maintaining the blade at a relatively uniform temperature. Turbine air flow is diverted from a compressor into the interior passageways within the blades. When turbine blades are replaced, it may be desirable to maintain a substantially similar level of cooling flow as was previously present.

BRIEF DESCRIPTION OF THE INVENTION

In an exemplary embodiment, a bucket for a turbine is described. The bucket includes an airfoil having a root portion, a tip portion, an airfoil shape, and a nominal profile substantially in accordance with Cartesian coordinate values of X, Y, and Z set forth in Table I, wherein Z is a distance from a platform on which the airfoil extends outwardly from, and X and Y are coordinates defining the profile at each distance Z from the platform. The bucket also includes a plurality of cooling passages extending between the root portion and tip portion of the airfoil, each of the plurality of cooling passages exiting at the tip portion, the plurality of cooling passages positioned in a camber line pattern.

In another exemplary embodiment, a gas turbine engine is described. The gas turbine engine includes a rotor comprising at least one rotor wheel and a plurality of buckets radially extending from the at least one rotor wheel. Each of the plurality of buckets includes an airfoil and a plurality of cooling passages. The airfoil has a nominal profile substantially in accordance with Cartesian coordinate values of X, Y, and Z set forth in Table I, wherein Z is a distance from a platform from which the airfoil extends outwardly therefrom, X and Y are coordinates defining the profile at each distance Z from the platform, the plurality of cooling passages extend between a root portion and a tip portion of each airfoil. The plurality of cooling passages positioned in a camber line pattern.

DETAILED DESCRIPTION OF THE INVENTION

Figure 1:
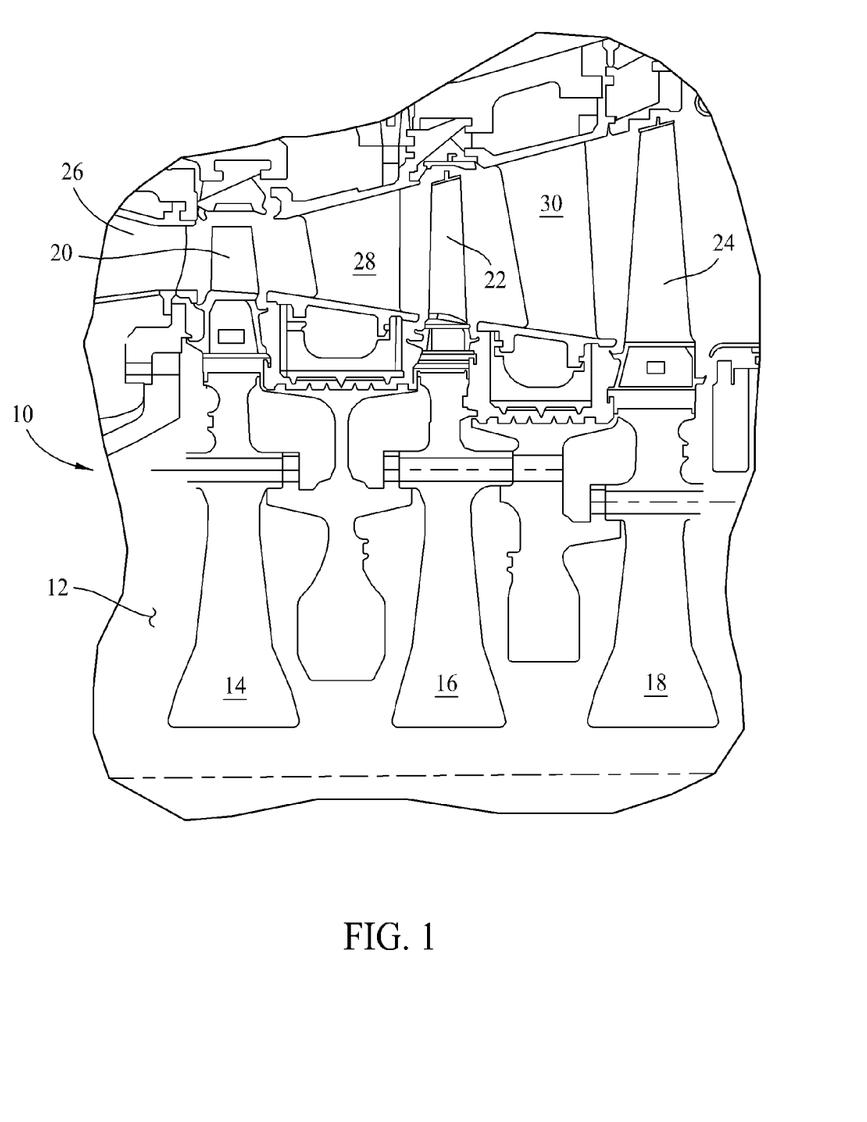
FIG. 1 is a schematic cross-sectional illustration of an exemplary turbine including a first stage turbine wheel.

FIG. 1 illustrates a cross-sectional view of an exemplary turbine 10. In the exemplary embodiment, turbine 10 includes a rotor 12 having respective first, second, and third stage rotor wheels 14, 16, and 18 that include respective buckets 20, 22, and 24 and respective stator vanes 26, 28, and 30. Each row of buckets 20, 22, and 24 and stator vanes 26, 28, and 30, defines a subsequent stage of turbine 10. In the exemplary embodiment, turbine 10 is a three stage turbine. Alternatively, turbine 10 may include more or less than three stages. In one embodiment, turbine 10 is a General Electric 6B gas turbine, manufactured by General Electric Company of Schenectady, N.Y.

Within the first turbine stage, rotor wheel 14 includes buckets 20 which are mounted in axial opposition to the upstream stator vanes 26. Buckets 20 are spaced circumferentially about first stage wheel 14. In the exemplary embodiment, first stage wheel 14 includes ninety-two buckets 20.

Figure 2:
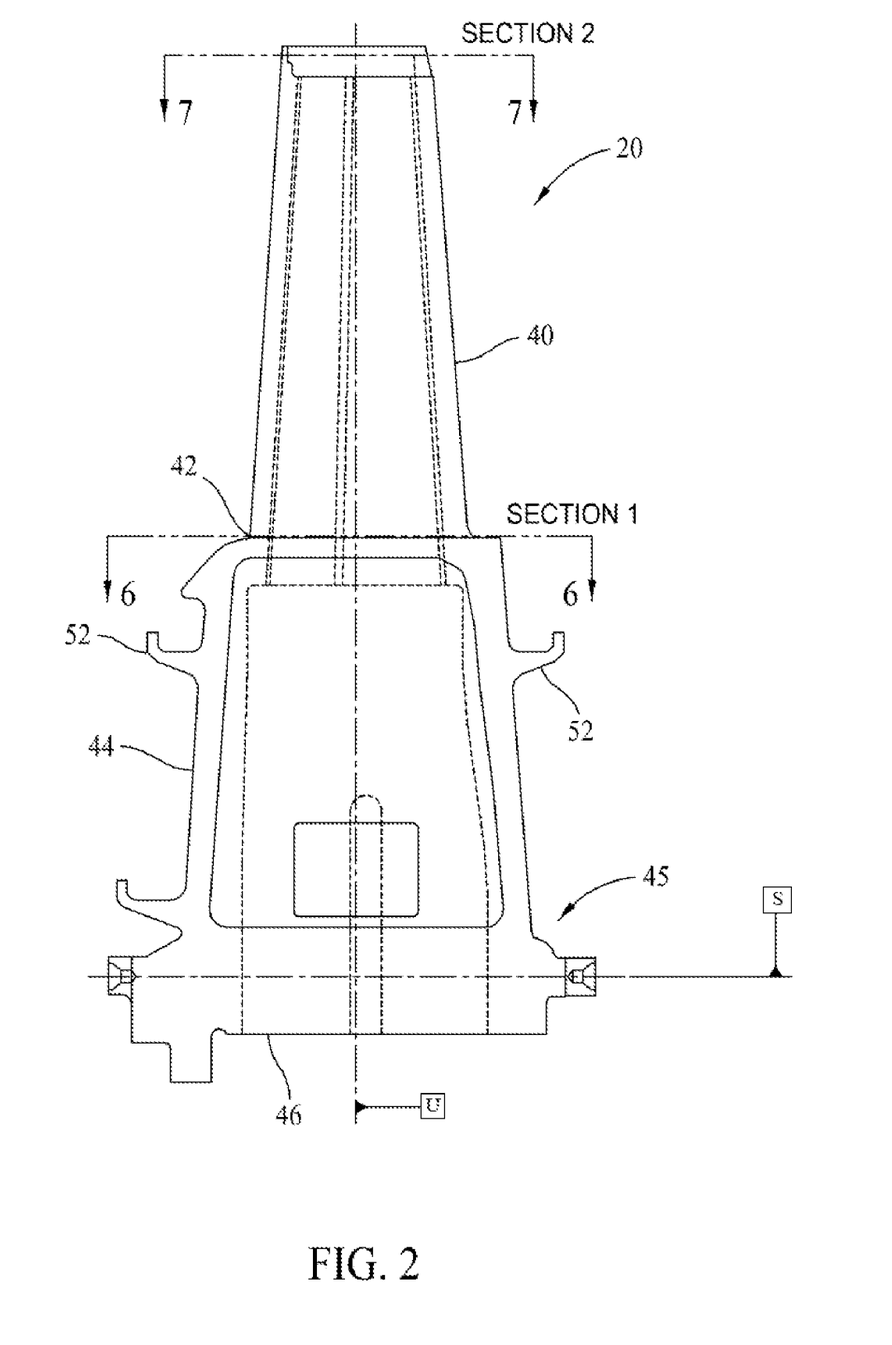
FIG. 2 is a front view of an exemplary turbine bucket that may be used within the turbine shown in FIG. 1.
Figure 3:
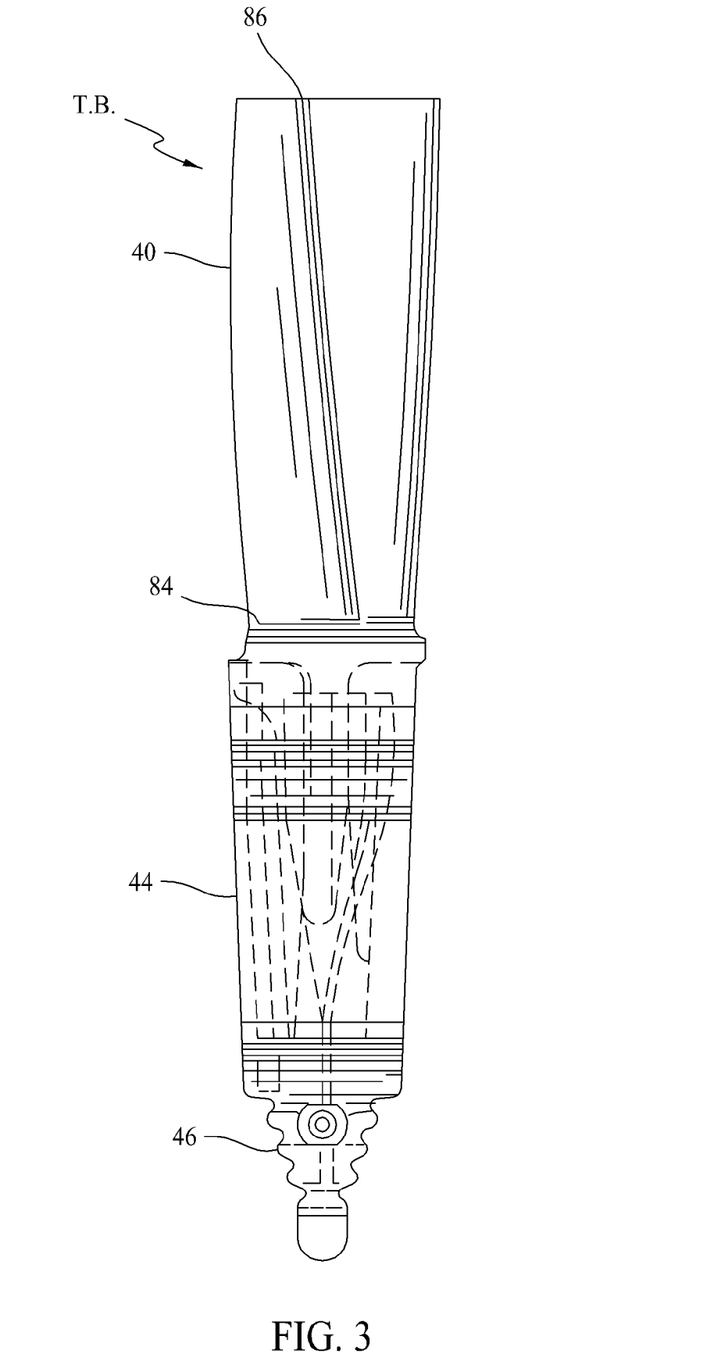
FIG. 3 is a side view of the turbine bucket shown in FIG. 2.

FIGS. 2 and 3 illustrate a perspective front view and a side view of an exemplary turbine bucket 20. In the exemplary embodiment, bucket 20 includes an airfoil 40 extending outward from a platform 42, and a shank 44 that extends outward from an opposite side of platform 42. The radial inner end of shank 44 extends from a dovetail 46 used for coupling bucket 20 to turbine wheel 14 (shown in FIG. 1). As is known, dovetail 46 mates in corresponding dovetail openings (not shown) defined in turbine wheel 14. Bucket 20 also includes wheel space seals, i.e., angel wings 52, that extend axially outward from shank 44. In an example embodiment, airfoil 40 is fabricated from a known nickel-based superalloy, such as Alloy 738.

Figure 4:
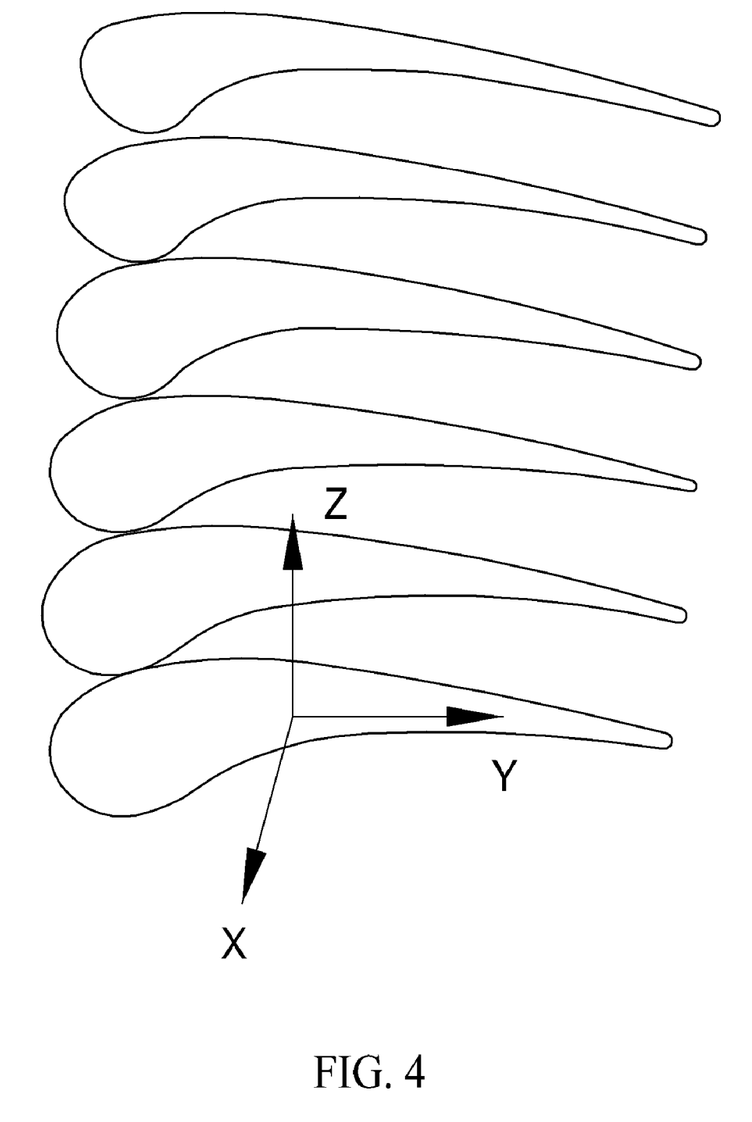
FIG. 4 illustrates a Cartesian coordinate system for X, Y, and Z values set forth in Table I.

FIG. 4 shows a Cartesian coordinate system for X, Y, and Z values set forth in Table I which follows. The Cartesian coordinate system has orthogonally related X, Y, and Z axes with the Z axis or datum lying substantially perpendicular to the platform 42 and extending generally in a radial direction through airfoil 40. The Y axis extends substantially parallel to a centerline of the turbine, i.e., the rotary axis. By defining X and Y coordinate values at selected locations in the radial direction, i.e., in a Z direction, the profile of the airfoil 40 can be ascertained. By connecting the X and Y values with smooth continuing arcs, each profile section at each radial distance Z is fixed. The surface profiles at the various surface locations between the radial distances Z can be ascertained by connecting adjacent profiles. The X and Y coordinates for determining the airfoil section profile at each radial location or airfoil height Z are tabulated in the following Table I, wherein Z equals zero at the upper surface of platform 42. These tabular values are given in inches and represent actual airfoil profiles at ambient, non-operating or non-hot conditions, and are for an uncoated airfoil. Airfoil 40 may be at least partially covered with a coating (not shown in FIG. 4), which may increase the dimensions of airfoil 40. In an exemplary embodiment, the coating protects airfoil 40 from corrosion and/or oxidation. Additionally, the sign convention used in Table I assigns a positive value to the value Z and positive and negative values for the coordinates X and Y, as typically used in a Cartesian coordinate system.

The values in Table I are computer-generated and shown to five decimal places. However, in view of manufacturing constraints, actual values useful for forming airfoil 40 are considered valid to only three decimal places for determining the profile of the airfoil 40. Moreover, there are typical manufacturing tolerances to be accounted for in the profile of airfoil 40. Accordingly, the values for the profile given in Table I are for a nominal airfoil. It should therefore be appreciated that plus or minus typical manufacturing tolerances are applicable to the X, Y, and Z values and that an airfoil having a profile substantially in accordance with those values includes such tolerances. For example, a manufacturing tolerance of about ±0.010 inches is within design limits for the airfoil and preferably a manufacturing tolerance of about ±0.008 inches is maintained. Accordingly, the values of X and Y carried to three decimal places and having a manufacturing tolerance about ±0.010 inches and preferably about ±0.008 inches are acceptable to define the profile of airfoil 40 at each radial position throughout its entire length.

Airfoil 40 imparts kinetic energy to the airflow and therefore contributes to a desired flow across a compressor (not shown). Airfoil 40 turns the fluid flow, slows relative velocity of the fluid flow, in the respective airfoil frame of reference, and yields a rise in the static pressure of the fluid flow. Airfoil 40, along with its interaction with surrounding airfoils and peripheral surfaces, facilitates, in certain exemplary embodiments: stage airflow efficiency, enhanced aeromechanics, smooth laminar flow from stage to stage, reduced thermal stresses, enhanced interrelation of the stages to effectively pass the airflow from stage to stage, and reduced mechanical stresses. Typically, multiple rows of airfoil stages, such as, but not limited to, rotor/stator airfoils, are oriented to achieve a desired discharge-to-inlet pressure ratio. Airfoils 40 can be coupled to wheels using dovetail 46 (shown in FIGS. 2 and 3).

The orientation of airfoil 40, and any interaction with surrounding airfoils, facilitates providing desirable fluid flow dynamics and laminar flow. Fluid flow intersects with airfoil 40 and is enhanced, and more specifically, the fluid dynamics and laminar flow from airfoil 40 are enhanced. As such, a smooth transition fluid flow to adjacent/downstream airfoils is facilitated. Moreover, flow from each airfoil 40 proceeds downstream towards the adjacent/downstream airfoils and is enhanced due to the enhanced laminar fluid flow from airfoil 40. Therefore, the orientation of airfoil 40 assists in preventing turbulent fluid flow in the unit comprising airfoil 40.

In the exemplary embodiment, the configuration of airfoil 40 (with or without fluid flow interaction) can be determined using various design processes and practices. Such design processes and practices may include any of, but also are not limited to only including: computational Fluid Dynamics (CFD); traditional fluid dynamics analysis; Euler and Navier-Stokes equations; manual positioning, flow testing (for example in wind tunnels), and modification of the airfoil; in-situ testing; modeling; application of scientific principles to design or develop the airfoils, machines, apparatus, or manufacturing processes; and airfoil flow testing and modification.

As noted above, the configuration of airfoil 40, and the interaction of airfoil 40 with surrounding airfoils and peripheral surfaces, facilitates stage airflow efficiency, enhanced aeromechanics, smooth laminar flow from stage-to-stage, reduced thermal stresses, enhanced interrelation of the stages to effectively pass the airflow from stage-to-stage, and reduced mechanical stresses, among other desirable effects, compared to other similar airfoils, which have like applications. In the exemplary embodiment, airfoil 40 facilitates increasing the efficiency of the turbine operation as compared to turbines using known airfoils. The increased efficiency provides, in addition to the above-noted advantages, an increased power output with a decrease in the amount of fuel required. As such, emissions produced from the engine are decreased.

As noted previously, airfoil 40 may also be coated for protection against corrosion and oxidation after airfoil 40 is manufactured, according to the values of Table I and within the tolerances explained above. Consequently, in addition to the manufacturing tolerances for the X and Y values set forth in Table I, there may also be an addition to those values to account for the coating thicknesses.

TABLE I

| X | Y | Z |
|---|---|---|
| −.06986 | −.73232 | 4.99300 |
| −.11292 | −.74977 | 4.99300 |
| −.16510 | −.74590 | 4.99300 |
| −.21697 | −.73320 | 4.99300 |
| −.26777 | −.71563 | 4.99300 |
| −.31745 | −.69477 | 4.99300 |
| −.36605 | −.67128 | 4.99300 |
| −.41359 | −.64564 | 4.99300 |
| −.45971 | −.61774 | 4.99300 |
| −.50388 | −.58705 | 4.99300 |
| −.54564 | −.55325 | 4.99300 |
| −.58419 | −.51801 | 4.99300 |
| −.61859 | −.47507 | 4.99300 |
| −.64788 | −.43044 | 4.99300 |
| −.67100 | −.38247 | 4.99300 |
| −.68699 | −.33177 | 4.99300 |
| −.69507 | −.27932 | 4.99300 |
| −.69456 | −.22637 | 4.99300 |
| −.68517 | −.17418 | 4.99300 |
| −.66741 | −.12420 | 4.99300 |
| −.64225 | −.07730 | 4.99300 |
| −.61107 | −.03390 | 4.99300 |
| −.57518 | .00601 | 4.99300 |
| −.53578 | .04265 | 4.99300 |
| −.49376 | .07647 | 4.99300 |
| −.44982 | .10788 | 4.99300 |
| −.40441 | .13718 | 4.99300 |
| −.35787 | .16474 | 4.99300 |
| −.31049 | .19095 | 4.99300 |
| −.26248 | .21608 | 4.99300 |
| −.21390 | .24029 | 4.99300 |
| −.16490 | .26357 | 4.99300 |
| −.11555 | .28626 | 4.99300 |
| −.06590 | .30815 | 4.99300 |
| −.01600 | .32942 | 4.99300 |
| .03415 | .35021 | 4.99300 |
| .08450 | .37054 | 4.99300 |
| .13500 | .39044 | 4.99300 |
| .18565 | .40997 | 4.99300 |
| .23643 | .42917 | 4.99300 |
| .29734 | .44810 | 4.99300 |
| .33834 | .46677 | 4.99300 |

TABLE I-continued

| X | Y | Z |
|---|---|---|
| .38944 | .48518 | 4.99300 |
| .44061 | .50337 | 4.99300 |
| .49187 | .52137 | 4.99300 |
| .54319 | .53917 | 4.99300 |
| .59457 | .55681 | 4.99300 |
| .64600 | .57432 | 4.99300 |
| .69748 | .59188 | 4.99300 |
| .74900 | .60895 | 4.99300 |
| .80055 | .82612 | 4.99300 |
| .85214 | .64322 | 4.99300 |
| .90373 | .66027 | 4.99300 |
| .95535 | .67727 | 4.99300 |
| 1.00695 | .69429 | 4.99300 |
| 1.05859 | .71120 | 4.99300 |
| 1.10978 | .72688 | 4.99300 |
| 1.15898 | .72763 | 4.99300 |
| 1.18500 | .69131 | 4.99300 |
| 1.18500 | .69131 | 4.99300 |
| 1.18885 | .65890 | 4.99300 |
| 1.17591 | .62949 | 4.99300 |
| 1.14831 | .60963 | 4.99300 |
| 1.11538 | 59389 | 4.99300 |
| 1.08182 | .57818 | 4.99300 |
| 1.04826 | .56258 | 4.99300 |
| 1.01472 | .54688 | 4.99300 |
| .98120 | .53118 | 4.99300 |
| .94767 | .51546 | 4.99300 |
| .91417 | .49969 | 4.99300 |
| .88069 | .48388 | 4.99300 |
| .84722 | .46805 | 4.99300 |
| .81377 | .45217 | 4.99300 |
| .78034 | .43624 | 4.99300 |
| .74694 | .42025 | 4.99300 |
| .71357 | .40418 | 4.99300 |
| .68024 | .38802 | 4.99300 |
| .64895 | .37176 | 4.99300 |
| .61372 | .35539 | 4.99300 |
| .58055 | .33889 | 4.99300 |
| .54744 | .32226 | 4.99300 |
| .51440 | .30545 | 4.99300 |
| .48145 | .28847 | 4.99300 |
| .44860 | .27131 | 4.99300 |
| .41586 | .25393 | 4.99300 |
| .38324 | .23631 | 4.99300 |
| .35074 | .21842 | 4.99300 |
| .31840 | .20024 | 4.99300 |
| .28623 | .18175 | 4.99300 |
| .25425 | .16292 | 4.99300 |
| .22249 | .14372 | 4.99300 |
| .19096 | .12411 | 4.99300 |
| .15970 | .10402 | 4.99300 |
| .12877 | .08342 | 4.99300 |
| .09821 | .06225 | 4.99300 |
| .06807 | .04045 | 4.99300 |
| .03842 | .01792 | 4.99300 |
| .00936 | −.00541 | 4.99300 |
| .01897 | −.02971 | 4.99300 |
| .04638 | −.05515 | 4.99300 |
| .07260 | −.08191 | 4.99300 |
| .09725 | −.11026 | 4.99300 |
| .11972 | −.14056 | 4.99300 |
| .13931 | −.17294 | 4.99300 |
| .15527 | −.20734 | 4.99300 |
| .16696 | −.24348 | 4.99300 |
| .17391 | −.28084 | 4.99300 |
| .17504 | −.31875 | 4.99300 |
| .17412 | −.35551 | 4.99300 |
| .18899 | −.39383 | 4.99300 |
| −.16071 | −.43058 | 4.99300 |
| −.14981 | −.46851 | 4.99300 |
| −.13612 | −.50152 | 4.99300 |
| −.12077 | −.53562 | 4.99300 |
| −.10428 | −.56899 | 4.99300 |
| −.08753 | −.60196 | 4.99300 |
| −.07198 | −.63501 | 4.99300 |
| −.06033 | −.66875 | 4.99300 |
| −.05774 | −.70251 | 4.99300 |
| −.06988 | −.73232 | 4.99300 |
| −.02155 | −.75817 | 4.49400 |
| −.06458 | −.77830 | 4.49400 |
| −.11760 | −.77634 | 4.49400 |
| −.17058 | −.76477 | 4.49400 |
| −.22253 | −.74790 | 4.49400 |
| −.27335 | −.72750 | 4.49400 |
| −.32305 | −.70430 | 4.49400 |
| −.37164 | −.67875 | 4.49400 |
| −.41894 | −.65096 | 4.49400 |
| −.46463 | −.62074 | 4.49400 |
| −.50818 | −.58767 | 4.49400 |
| −.54900 | −.55140 | 4.49400 |
| −.58833 | −.51170 | 4.49400 |
| −.61934 | −.46845 | 4.49400 |
| −.64702 | −.42176 | 4.49400 |
| −.66842 | −.37199 | 4.49400 |
| .68264 | −.31982 | 4.49400 |
| .68887 | −.26620 | 4.49400 |
| .68659 | −.21223 | 4.49400 |
| .67589 | −.15929 | 4.49400 |
| .65736 | −.10844 | 4.49400 |
| .63203 | −.06048 | 4.49400 |
| .60102 | −.01574 | 4.49400 |
| .56553 | .02572 | 4.49400 |
| .52654 | .06411 | 4.49400 |
| .48487 | .09970 | 4.49400 |
| .44112 | .13278 | 4.49400 |
| .39575 | .16371 | 4.49400 |
| .34914 | .19287 | 4.49400 |
| .30158 | .22059 | 4.49400 |
| .25326 | .24711 | 4.49400 |
| .20433 | .27256 | 4.49400 |
| .15491 | .29705 | 4.49400 |
| .10510 | .32068 | 4.49400 |
| .05496 | .34360 | 4.49400 |
| .00451 | .36596 | 4.49400 |
| .04618 | .38779 | 4.49400 |
| .09706 | .40911 | 4.49400 |
| .14813 | .43000 | 4.49400 |
| .19936, | .45051 | 4.49400 |
| .25074 | .47070 | 4.49400 |
| .30225 | .49056 | 4.49400 |
| .35386 | .51015 | 4.49400 |
| .40558 | .52946 | 4.49400 |
| .45740 | .54854 | 4.49400 |
| .50930 | .56739 | 4.49400 |
| .56127 | .58605 | 4.49400 |
| .61331 | .60455 | 4.49400 |
| .66540 | .62289 | 4.49400 |
| .71754 | .64109 | 4.49400 |
| .76973 | .65919 | 4.49400 |
| .82195 | .67718 | 4.49400 |
| .87420 | .69511 | 4.49400 |
| .92648 | .71295 | 4.49400 |
| 1.03102 | .74848 | 4.49400 |
| 1.08305 | .76612 | 4.49400 |
| 1.13161 | .76672 | 4.49400 |
| 1.16606 | .73288 | 4.49400 |
| 1.16606 | .73288 | 4.49400 |
| 1.17007 | .70022 | 4.49400 |
| 1.15668 | .67046 | 4.49400 |
| 1.12824 | .65050 | 4.49400 |
| 1.09475 | .63425 | 4.49400 |
| 1.06075 | .61807 | 4.49400 |
| 1.02671 | .60203 | 4.49400 |
| .99267 | .58595 | 4.49400 |
| .95862 | .56990 | 4.49400 |
| .92456 | .55386 | 4.49400 |
| .89051 | .53780 | 4.49400 |
| .85646 | .52172 | 4.49400 |
| .82243 | .50559 | 4.49400 |
| .78842 | .48941 | 4.49400 |
| .75445 | .47316 | 4.49400 |
| .72050 | .45684 | 4.49400 |
| .68660 | .44042 | 4.49400 |
| .65274 | .42389 | 4.49400 |
| .61895 | .40722 | 4.49400 |
| .58523 | .39040 | 4.49400 |

TABLE I-continued

| X | Y | Z |
| --- | --- | --- |
| .55158 | .37342 | 4.49400 |
| .51803 | .35624 | 4.49400 |
| .48458 | .33884 | 4.49400 |
| .45125 | .32121 | 4.49400 |
| .41805 | .30331 | 4.49400 |
| .38500 | .28513 | 4.49400 |
| .35213 | .26662 | 4.49400 |
| .31945 | .24773 | 4.49400 |
| .28699 | .22844 | 4.49400 |
| .25479 | .20870 | 4.49400 |
| .22287 | .18848 | 4.49400 |
| .19129 | .16775 | 4.49400 |
| .16008 | .14640 | 4.49400 |
| .12932 | .12437 | 4.49400 |
| .09907 | .10159 | 4.49400 |
| .06944 | .07799 | 4.49400 |
| .04053 | .05343 | 4.49400 |
| .01250 | .02782 | 4.49400 |
| −.01448 | .00102 | 4.49400 |
| −.04017 | −.02709 | 4.49400 |
| −.06427 | −.05666 | 4.49400 |
| −.08642 | −.08781 | 4.49400 |
| −.08642 | −.08781 | 4.49400 |
| −.10619 | −.12063 | 4.49400 |
| −.12303 | −.15515 | 4.49400 |
| −.13641 | −.19122 | 4.49400 |
| −.14565 | −.22855 | 4.49400 |
| −.15108 | −.26672 | 4.49400 |
| −.15205 | −.30521 | 4.49400 |
| −.14904 | −.34352 | 4.49400 |
| −.14274 | −.38128 | 4.49400 |
| −.13378 | −.41841 | 4.49400 |
| −.12227 | −.45482 | 4.49400 |
| −.10850 | −.49036 | 4.49400 |
| −.09287 | −.52504 | 4.49400 |
| −.07586 | −.55893 | 4.49400 |
| −.05809 | −.59225 | 4.49400 |
| −.04042 | −.62535 | 4.49400 |
| −.02426 | −.65873 | 4.49400 |
| −.01229 | −.69297 | 4.49400 |
| −.00957 | −.72740 | 4.49400 |
| −.02155 | −.75817 | 4.49400 |
| .02477 | −.78493 | 3.99400 |
| −.01835 | −.80761 | 3.99400 |
| −.07238 | −.80739 | 3.99400 |
| −.12664 | −.79681 | 3.99400 |
| −.17991 | −.78054 | 3.99400 |
| −.23206 | −.76050 | 3.99400 |
| −.28306 | −.73751 | 3.99400 |
| −.33287 | −.71195 | 3.99400 |
| −.38150 | −.68413 | 3.99400 |
| −.42874 | −.65414 | 3.99400 |
| −.47410 | −.62154 | 3.99400 |
| −.51710 | −.58597 | 3.99400 |
| −.55716 | −.54724 | 3.99400 |
| −.59353 | −.50515 | 3.99400 |
| −.62532 | −.45964 | 3.99400 |
| −.65159 | −.41086 | 3.99400 |
| −.67140 | −.35922 | 3.99400 |
| −.68389 | −.30543 | 3.99400 |
| −.68839 | −.25039 | 3.99400 |
| −.68465 | −.19532 | 3.99400 |
| −.67284 | −.14135 | 3.99400 |
| −.65360 | −.08952 | 3.99400 |
| −.62785 | −.04042 | 3.99400 |
| −.59665 | .00557 | 3.99400 |
| −.56104 | .04844 | 3.99400 |
| −.52196 | .08827 | 3.99400 |
| −.48011 | .12531 | 3.99400 |
| −.43609 | .15985 | 3.99400 |
| −.39039 | .19224 | 3.99400 |
| −.34337 | .22265 | 3.99400 |
| −.29532 | .25196 | 3.99400 |
| −.24645 | .27979 | 3.99400 |
| −.19692 | .30641 | 3.99400 |
| −.14656 | .33200 | 3.99400 |
| −.09635 | .35673 | 3.99400 |
| −.04547 | .38080 | 3.99400 |
| .00569 | .40426 | 3.99400 |
| .05712 | .42712 | 3.99400 |
| .10877 | .44946 | 3.99400 |
| .16062 | .47137 | 3.99400 |
| .21266 | .49290 | 3.99400 |
| .26484 | .51407 | 3.99400 |
| .31716 | .53488 | 3.99400 |
| .36962 | .55539 | 3.99400 |
| .42218 | .57562 | 3.99400 |
| .47485 | 59560 | 3.99400 |
| .52761 | .61535 | 3.99400 |
| .58044 | .63491 | 3.99400 |
| .63334 | .65428 | 3.99400 |
| .68630 | .67350 | 3.99400 |
| .73932 | .69259 | 3.99400 |
| .79238 | .71156 | 3.99400 |
| .84548 | .73043 | 3.99400 |
| .89860 | .74921 | 3.99400 |
| .95177 | .76793 | 3.99400 |
| 1.00488 | .78654 | 3.99400 |
| 1.05785 | .80533 | 3.99400 |
| 1.10820 | .80637 | 3.99400 |
| 1.14417 | .77390 | 3.99400 |
| 1.14417 | .77390 | 3.99400 |
| 1.14840 | .74076 | 3.99400 |
| 1.13451 | .71056 | 3.99400 |
| 1.10518 | .69043 | 3.99400 |
| 1.07106 | .67358 | 3.99400 |
| 1.03656 | .65684 | 3.99400 |
| 1.00199 | .64023 | 3.99400 |
| .96742 | .62362 | 3.99400 |
| .93283 | .60705 | 3.99400 |
| .89821 | .59051 | 3.99400 |
| .86360 | .57395 | 3.99400 |
| .82900 | .55736 | 3.99400 |
| .79442 | .54071 | 3.99400 |
| .75987 | .52398 | 3.99400 |
| .72536 | .50716 | 3.99400 |
| .69090 | .49024 | 3.99400 |
| .65650 | .47321 | 3.99400 |
| .62216 | .45602 | 3.99400 |
| .58790 | .43865 | 3.99400 |
| .55373 | .42110 | 3.99400 |
| .51967 | .40333 | 3.99400 |
| .48573 | .38532 | 3.99400 |
| .45193 | .36702 | 3.99400 |
| .41828 | .34842 | 3.99400 |
| .38482 | .32949 | 3.99400 |
| .35155 | .31019 | 3.99400 |
| .31852 | .29049 | 3.99400 |
| .28574 | .27030 | 3.99400 |
| .25328 | .24960 | 3.99400 |
| .22116 | .22833 | 3.99400 |
| .18945 | .20645 | 3.99400 |
| .15818 | .18391 | 3.99400 |
| .12745 | .16060 | 3.99400 |
| .09736, | .13641 | 3.99400 |
| .06801 | .11128 | 3.99400 |
| .03954 | .08509 | 3.99400 |
| .01214 | .05772 | 3.99400 |
| −.01396 | .02903 | 3.99400 |
| −.03851 | −.00108 | 3.99400 |
| −.06116 | −.03271 | 3.99400 |
| −.08153 | −.06595 | 3.99400 |
| −.09916 | −.10081 | 3.99400 |
| −.11358 | −.13718 | 3.99400 |
| −.12441 | −.17481 | 3.99400 |
| −.13140 | −.21336 | 3.99400 |
| −.13441 | −.25241 | 3.99400 |
| −.13357 | −.29154 | 3.99400 |
| −.12916 | −.33036 | 3.99400 |
| −.12165 | −.36861 | 3.99400 |
| −.11158 | −.40615 | 3.99400 |
| −.09934 | −.44299 | 3.99400 |
| −.08505 | −.47906 | 3.99400 |
| −.06897 | −.51431 | 3.99400 |
| −.05146 | −.54878 | 3.99400 |
| −.03294 | −.58260 | 3.99400 |

TABLE I-continued

| X | Y | Z |
|---|---|---|
| −.01398 | −.61600 | 3.99400 |
| .00461 | −.64935 | 3.99400 |
| .02141 | −.68315 | 3.99400 |
| .03376 | −.71797 | 3.99400 |
| .03662 | −.75314 | 3.99400 |
| .02477 | −.78493 | 3.99400 |
| .06935 | −.81311 | 3.49500 |
| .02601 | −.83799 | 3.49500 |
| −.02911 | −.83926 | 3.49500 |
| −.08471, | −.82955, | 3.49500 |
| −.13938 | −.81383 | 3.49500 |
| −.19294 | −.79415 | 3.49500 |
| −.24533 | −.77137 | 3.49500 |
| −.29650 | −.74586 | 3.49500 |
| −.34650 | −.71799 | 3.49500 |
| −.39528 | −.68808 | 3.49500 |
| −.44240 | −.65578 | 3.49500 |
| −.48749 | −.62078 | 3.49500 |
| −.53005 | −.58286 | 3.49500 |
| −.56946 | −.54178 | 3.49500 |
| −.60491 | −.49737 | 3.49500 |
| −.63553 | −.44962 | 3.49500 |
| −.66039 | −.39875 | 3.49500 |
| −.67860 | −.34523 | 3.49500 |
| −.68939 | −.28974 | 3.49500 |
| −.69223 | −.23334, | 3.49500 |
| −.68698 | −.17711 | 3.49500 |
| −.67391 | −.12217 | 3.49500 |
| −.65370 | −.06932 | 3.49500 |
| −.62726 | −.01916 | 3.49500 |
| −.59558 | .02803 | 3.49500 |
| −.55963 | .07216 | 3.49500 |
| −.52021 | .11334 | 3.49500 |
| −.47800 | 15178 | 3.49500 |
| −.43360 | .18777 | 3.49500 |
| −.38746 | .22167 | 3.49500 |
| −.33996 | .25379 | 3.49500 |
| .29137 | .28430 | 3.49500 |
| .24187 | .31335 | 3.49500 |
| −.19165 | .34113 | 3.49500 |
| −.14083 | .36787 | 3.49500 |
| −.08955 | .39381 | 3.49500 |
| −.03789 | .41901 | 3.49500 |
| .01409 | .44350 | 3.49500 |
| .06637 | .46738 | 3.49500 |
| .11889 | .49075 | 3.49500 |
| .17163 | .51367 | 3.49500 |
| .22456 | .53618 | 3.49500 |
| .27765 | .55827 | 3.49500 |
| .33090 | .58001 | 3.49500 |
| .38429 | .60145 | 3.49500 |
| .43779 | .62259 | 3.49500 |
| .49140 | .64347 | 3.49500 |
| .54510 | .66414 | 3.49500 |
| .59888 | .68459 | 3.49500 |
| .65273 | .70487 | 3.49500 |
| .70665 | .72500 | 3.49500 |
| .76062 | .74498 | 3.49500 |
| .81463 | .76485 | 3.49500 |
| .86869 | .78461 | 3.49500 |
| .92279 | .80429 | 3.49500 |
| .97689 | .82387 | 3.49500 |
| 1.03093 | .84350 | 3.49500 |
| 1.08236 | .84679 | 3.49500 |
| 1.11902 | .81356 | 3.49500 |
| 1.11902 | .81356 | 3.49500 |
| 1.12350 | .77994 | 3.49500 |
| 1.07932 | .72885 | 3.49500 |
| 1.04473 | .71135 | 3.49500 |
| 1.00986 | .69394 | 3.49500 |
| .97494 | .67663 | 3.49500 |
| .94002 | .65929 | 3.49500 |
| .90509 | .64197 | 3.49500 |
| .87016 | .62465 | 3.49500 |
| .83523 | .60730 | 3.49500 |
| .80033 | .58988 | 3.49500 |
| .76547 | .57237 | 3.49500 |
| .73067 | .55475 | 3.49500 |

TABLE I-continued

| X | Y | Z |
|---|---|---|
| .69592 | .53699 | 3.49500 |
| .66124 | .51910 | 3.49500 |
| .62664 | .50105 | 3.49500 |
| .59213 | .48281 | 3.49500 |
| .55773j | .46435 | 3.49500 |
| .52345 | .44564 | 3.49500 |
| .48931 | .42668 | 3.49500 |
| .45533 | .40742 | 3.49500 |
| .42153 | .38782 | 3.49500 |
| .38793 | .36786 | 3.49500 |
| .35457 | .34749 | 3.49500 |
| .32146 | .32670 | 3.49500 |
| .28864 | .30542 | 3.49500 |
| .25617 | .28357 | 3.49500 |
| .22410 | .26111 | 3.49500 |
| .19249 | .23799 | 3.49500 |
| .16139 | .21416 | 3.49500 |
| .13088 | .18954 | 3.49500 |
| .10107 | .16403 | 3.49500 |
| .07210 | .13750 | 3.49500 |
| .04413 | .10987 | 3.49500 |
| .01732 | .08105 | 3.49500 |
| −.00807 | .05089 | 3.49500 |
| −.03175 | .01930 | 3.49500 |
| −.05341 | −.01379 | 3.49500 |
| −.07264 | −.04841 | 3.49500 |
| −.08904 | −.08454 | 3.49500 |
| −.10212 | −.12207 | 3.49500 |
| −.11152 | −.16072 | 3.49500 |
| −.11706 | −.20011 | 3.49500 |
| .11872 | −.23983 | 3.49500 |
| −.11663 | −.27950 | 3.49500 |
| −.11115 | −.31878 | 3.49500 |
| −.10272 | −.35745 | 3.49500 |
| −.09186 | −.39540 | 3.49500 |
| −.07894 | −.43262 | 3.49500 |
| −.06423 | −.46914 | 3.49500 |
| −.04784 | −.50492 | 3.49500 |
| −.03000 | −.53993 | 3.49500 |
| −.01102 | −.57425 | 3.49500 |
| .00871 | −.60803 | 3.49500 |
| .02867 | −.64152 | 3.49500 |
| .04804 | −.67508 | 3.49500 |
| .06542 | −.70924 | 3.49500 |
| .07805 | −.74456 | 3.49500 |
| .08105 | −.78038 | 3.49500 |
| .06935 | −.81311 | 3.49500 |
| .11359 | −.84266 | 2.99600 |
| .06992 | −.86942 | 2.99600 |
| .01363 | −.87191 | 2.99600 |
| −.04337 | −.86295 | 2.99600 |
| −.09949 | −.84773 | 2.99600 |
| −.15454 | −.82241 | 2.99600 |
| −.20842 | −.80590 | 2.99600 |
| −.26105 | −.78051 | 2.99600 |
| −.31249 | −.75262 | 2.99600 |
| −.36277 | −.72266 | 2.99600 |
| −.41166 | −.69058 | 2.99600 |
| −.45881 | −.65609 | 2.99600 |
| −.50378, | −.61891 | 2.99600 |
| −.54603 | −.57877 | 2.99600 |
| −.58489 | −.53544 | 2.99600 |
| −.61955 | −.48880 | 2.99600 |
| −.64912 | −.43891 | 2.99600 |
| −.67270 | −.38601 | 2.99600 |
| −.68941 | −.33060 | 2.99600 |
| −.69851 | −.27351 | 2.99600 |
| −.69962 | −.21573 | 2.99600 |
| −.69275 | −.15837 | 2.99600 |
| −.67835 | −.10236 | 2.99600 |
| −.65711 | −.04847 | 2.99600 |
| −.62994 | .00281 | 2.99600 |
| −.59773 | .05118 | 2.99600 |
| −.56132 | .09661 | 2.99600 |
| −.52147 | .13918 | 2.99600 |
| −.47886 | .17907 | 2.99600 |
| −.43403 | .21660 | 2.99600 |
| −.38745 | .25206 | 2.99600 |

TABLE I-continued

| X | Y | Z |
|---|---|---|
| −.33940 | .28559 | 2.99600 |
| −.29014 | .31734 | 2.99600 |
| −.23988 | .34755 | 2.99600 |
| −.18885 | .37649 | 2.99600 |
| −.13721 | .40445 | 2.99600 |
| −.08508 | .43151 | 2.99600 |
| −.03253 | .45771 | 2.99600 |
| .02039 | .48320 | 2.99600 |
| .07361 | .50810 | 2.99600 |
| .12709 | .53247 | 2.99600 |
| .18079 | S5G35 | 2.99600 |
| .23470 | .57977 | 2.99600 |
| .28880 | .60280 | 2.99600 |
| .34304 | .62548 | 2.99600 |
| .39743 | .64783 | 2.99600 |
| .45194 | .66989 | 2.99600 |
| .50656, | .69171 | 2.99600 |
| .56127 | .71328 | 2.99600 |
| .61607 | .73466 | 2.99600 |
| .67093 | .75587 | 2.99600 |
| .72586 | .77691 | 2.99600 |
| .78084 | .79783 | 2.99600 |
| .83587 | .81863 | 2.99600 |
| .89095 | .83933 | 2.99600 |
| .94605 | .85994 | 2.99600 |
| 1.00115 | 88050 | 2.99600 |
| 1.05362 | .88554 | 2.99600 |
| 1.09146 | .85197 | 2.99600 |
| 1.09146 | .85197 | 2.99600 |
| 1.09626 | .81792 | 2.99600 |
| 1.08202 | .78677 | 2.99600 |
| 1.05172 | .76591 | 2.99600 |
| 1.01688 | .74769 | 2.99600 |
| .98186 | .72950 | 2.99600 |
| .94682 | .71132 | 2.99600 |
| .91181 | .69306 | 2.99600 |
| .87684 | .67475 | 2.99600 |
| .84189 | .65639 | 2.99600 |
| .80697 | .63793 | 2.99600 |
| .77212 | .61936 | 2.99600 |
| .73733 | .60066 | 2.99600 |
| .70261 | .58181 | 2.99600 |
| .66799 | .56278 | 2.99600 |
| .63346 | .54356 | 2.99600 |
| .59905 | .52414 | 2.99600 |
| .56476 | .50449 | 2.99600 |
| .53061 | .48457 | 2.99600 |
| .49663 | .46436 | 2.99600 |
| .46282 | .44385 | 2.99600 |
| .42921 | .42300 | 2.99600 |
| .39583 | .40175 | 2.99600 |
| .36272 | .38008 | 2.99600 |
| .32989 | .35797 | 2.99600 |
| .29738 | .33537 | 2.99600 |
| .26523 | .31222 | 2.99600 |
| .23352 | .28845 | 2.99600 |
| .20231 | .26400 | 2.99600 |
| .17166 | .23881 | 2.99600 |
| .14165 | .21284 | 2.99600 |
| .11237 | .18602 | 2.99600 |
| .08397 | .15820 | 2.99600 |
| .05662 | .12929 | 2.99600 |
| .03051 | .09921 | 2.99600 |
| .00584 | .06786 | 2.99600 |
| −.01708 | .03513 | 2.99600 |
| −.03793 | .00099 | 2.99600 |
| −.05636 | −.03458 | 2.99600 |
| −.07199 | −.07154 | 2.99600 |
| −.08443 | −.10974 | 2.99600 |
| −.09332 | −.14897 | 2.99600 |
| −.09842 | −.18888 | 2.99600 |
| −.09974 | −.22907 | 2.99600 |
| −.09743 | −.26918 | 2.99600 |
| −.09174 | −.30890 | 2.99600 |
| −.08309 | −.34802 | 2.99600 |
| −.07195 | −.38640 | 2.99600 |
| −.05877 | −.42404 | 2.99600 |
| −.04387 | −.46097 | 2.99600 |
| −.02743 | −.49722 | 2.99600 |
| −.00954 | −.53275 | 2.99600 |
| .00959 | −.56757 | 2.99600 |
| .02967 | −.60178 | 2.99600 |
| .05036 | −.63551 | 2.99600 |
| .07112 | −.66902 | 2.99600 |
| .09116 | −.70271 | 2.99600 |
| .10904 | −.73710 | 2.99600 |
| .12200 | −.77279 | 2.99600 |
| .12506 | −.80911 | 2.99600 |
| .11359 | −.84266 | 2.99600 |
| .15647 | −.87304 | 2.49700 |
| .11239 | −.90134 | 2.49700 |
| .05498 | −.90491 | 2.49700 |
| −.00335 | −.89672 | 2.49700 |
| −.06088 | −.88209 | 2.49700 |
| −.11738 | −.86326 | 2.49700 |
| −.17274 | −.84115 | 2.49700 |
| −.22683 | −.81605 | 2.49700 |
| −.27967 | −.78828 | 2.49700 |
| −.33130 | −.75822 | 2.49700 |
| −.38173 | −.72618 | 2.49700 |
| −.43060 | −.69195 | 2.49700 |
| −.47748 | −.65515 | 2.49700 |
| −.52192 | −.61551 | 2.49700 |
| −.56331 | −.57281 | 2.49700 |
| −.60097 | −.52687 | 2.49700 |
| −.63406 | −.47766 | 2.49700 |
| −.66172 | −.42530 | 2.49700 |
| −.68309 | −.37011 | 2.49700 |
| −.69739 | −.31276 | 2.49700 |
| −.70414 | −.25406 | 2.49700 |
| −.70319 | −.19501 | 2.49700 |
| −.69475 | −.13652 | 2.49700 |
| −.67930 | −.07944 | 2.49700 |
| −.65747 | −.02440 | 2.49700 |
| −.63000 | .02813 | 2.49700 |
| −.59764 | .07791 | 2.49700 |
| −.56113 | .12482 | 2.49700 |
| −.52117 | .16890 | 2.49700 |
| −.47837 | .21039 | 2.49700 |
| −.43331 | .24953 | 2.49700 |
| −.38633 | .28638 | 2.49700 |
| −.33770 | .32109 | 2.49700 |
| −.28773 | .35394 | 2.49700 |
| −.23672 | .38525 | 2.49700 |
| −.18491 | .41531 | 2.49700 |
| −.13247 | .44427 | 2.49700 |
| −.07947 | .47222 | 2.49700 |
| −.02602 | .49934 | 2.49700 |
| .02781 | .52575 | 2.49700 |
| .08194 | .55156 | 2.49700 |
| .13635 | .57681 | 2.49700 |
| .19100 | .60153 | 2.49700 |
| .24587 | .62580 | 2.49700 |
| .30091 | .64969 | 2.49700 |
| .35612 | .67320 | 2.49700 |
| .41148 | .69638 | 2.49700 |
| .46695 | .71929 | 2.49700 |
| .52254 | .74193 | 2.49700 |
| .57823 | .76434 | 2.49700 |
| .63399 | .78656 | 2.49700 |
| .68984 | .80860 | 2.49700 |
| .745741 | .83050 | 2.49700 |
| .80169 | .85226 | 2.49700 |
| .85770 | .87392 | 2.49700 |
| .91374 | .89546 | 2.49700 |
| .96978 | .91693 | 2.49700 |
| 1.02348 | .92334 | 2.49700 |
| 1.06263 | .88977 | 2.49700 |
| 1.06263 | .88977 | 2.49700 |
| 1.06773 | .85538 | 2.49700 |
| 1.05355 | .82380 | 2.49700 |
| 1.02307 | .60250 | 2.49700 |
| .98809 | .78362 | 2.49700 |
| .95302 | .76469 | 2.49700 |
| .91797 | .74568 | 2.49700 |
| .88300 | .72651 | 2.49700 |

TABLE I-continued

| X | Y | Z |
|---|---|---|
| .84811 | .70722 | 2.49700 |
| .81329 | .68780 | 2.49700 |
| .77855 | .66822 | 2.49700 |
| .74390 | .64847 | 2.49700 |
| .70935 | .62853 | 2.49700 |
| .67492 | .60839 | 2.49700 |
| .64061 | .58802 | 2.49700 |
| .60645 | .56741 | 2.49700 |
| .57244 | .54653 | 2.49700 |
| .53860 | .52536 | 2.49700 |
| .50496 | .50387 | 2.49700 |
| .47153 | .48203 | 2.49700 |
| .43834 | .45983 | 2.49700 |
| .40541 | .43722 | 2.49700 |
| .37278 | .41416 | 2.49700 |
| .34048 | .39061 | 2.49700 |
| .30855 | .36656 | 2.49700 |
| .27704 | .34194 | 2.49700 |
| .24600 | .31669 | 2.49700 |
| .21551 | .29075 | 2.49700 |
| .18565 | .26405 | 2.49700 |
| .15651 | .23654 | 2.49700 |
| .12818 | .20818 | 2.49700 |
| .10076 | .17889 | 2.49700 |
| .07443 | .14856 | 2.49700 |
| .04940 | .11709 | 2.49700 |
| .02567 | .08444 | 2.49700 |
| .80406 | .05055 | 2.49700 |
| −.01571 | .01537 | 2.49700 |
| −.03314 | −.02107 | 2.49700 |
| −.04791 | −.05872 | 2.49700 |
| −.05972 | −.09746 | 2.49700 |
| −.06826 | −.13708, | 2.49700 |
| −.07334 | −.17731 | 2.49700 |
| −.07488 | −.21782 | 2.49700 |
| −.07301 | −.25828 | 2.49700 |
| −.06794 | −.29844 | 2.49700 |
| −.05996 | −.33806 | 2.49700 |
| −.04946 | −.37702 | 2.49700 |
| −.03683 | −.41527 | 2.49700 |
| −.02242 | −.45280 | 2.49700 |
| −.00645 | −.48966 | 2.49700 |
| .01094 | −.52585 | 2.49700 |
| .02968 | −.56135 | 2.49700 |
| .04956 | −.59616 | 2.49700 |
| .07033 | −.63037 | 2.49700 |
| .09165 | −.66413 | 2.49700 |
| .11300 | −.69771 | 2.49700 |
| .13355 | −.73151 | 2.49700 |
| .15180 | −.76608 | 2.49700 |
| .16488 | −.80206 | 2.49700 |
| .16782 | −.83878 | 2.49700 |
| .15647 | −.87304 | 2.49700 |
| .19499 | −.90397 | 1.99700 |
| .15047 | −.93353 | 1.99700 |
| .09208 | −.93832 | 1.99700 |
| .03256 | −.93120 | 1.99700 |
| −.02626 | −.91750 | 1.99700 |
| −.08411 | −.89949 | 1.99700 |
| −.14086 | −.87809 | 1.99700 |
| −.19636 | −.85360 | 1.99700 |
| −.25047 | −.82617 | 1.99700 |
| −.30319 | −.79599 | 1.99700 |
| −.35470 | −.76368 | 1.99700 |
| −.40463 | −.72918 | 1.99700 |
| −.45256 | −.69203 | 1.99700 |
| −.49806 | −.65202 | 1.99700 |
| −.54057 | −.60894 | 1.99700 |
| −.57949 | −.56265 | 1.99700 |
| −.61412 | −.51314 | 1.99700 |
| −.64376 | −.46056 | 1.99700 |
| −.66771 | −.40520 | 1.99700 |
| −.68544 | −.34758 | 1.99700 |
| −.69657 | −.28832 | 1.99700 |
| −.70087 | −.22820 | 1.99700 |
| −.69838 | −.16799 | 1.99700 |
| −.66923 | −.10844 | 1.99700 |
| −.67373 | −.05021 | 1.99700 |
| −.65226 | .00615 | 1.99700 |
| −.62529 | .06014 | 1.99700 |
| −.59340 | .11144 | 1.99700 |
| −.55721 | .15985 | 1.99700 |
| −.51742 | .20550 | 1.99700 |
| −.47470 | .24854 | 1.99700 |
| −.42947 | .28895 | 1.99700 |
| −.38207 | .32686 | 1.99700 |
| −.33288 | .36255 | 1.99700 |
| −.28229 | .39636 | 1.99700 |
| −.23064 | .42861 | 1.99700 |
| −.17814 | .45950 | 1.99700 |
| −.12493 | .48919 | 1.99700 |
| −.07114 | .51788 | 1.99700 |
| −.01690 | .54576 | 1.99700 |
| .03771 | .57293 | 1.99700 |
| .09265 | .59946 | 1.99700 |
| .14789 | .62537 | 1.99700 |
| .20338 | .65077 | 1.99700 |
| .25906 | .67574 | 1.99700 |
| .31497 | .70027 | 1.99700 |
| .37103 | .72444 | 1.99700 |
| .42723 | .74829 | 1.99700 |
| .48357 | .77184 | 1.99700 |
| .54002 | .79513 | 1.99700 |
| .59656 | .81820 | 1.99700 |
| .65319 | .84106 | 1.99700 |
| .70989 | .86377 | 1.99700 |
| .76665 | .88632 | 1.99700 |
| .82347 | .90875 | 1.99700 |
| .88033 | .93105 | 1.99700 |
| .93723 | .95322 | 1.99700 |
| .99186 | .96094 | 1.99700 |
| 1.03209 | .92728 | 1.99700 |
| 1.03209 | .92728 | 1.99700 |
| 1.03741 | .89264 | 1.99700 |
| 1.02322 | .86075 | 1.99700 |
| .99255 | .83915 | 1.99700 |
| .95745 | .81977 | 1.99700 |
| .92234 | .80027 | 1.99700 |
| .88729 | .78061 | 1.99700 |
| .85235 | .76071 | 1.99700 |
| .81758 | .74063 | 1.99700 |
| .78289 | .72034 | 1.99700 |
| .74833 | .69982 | 1.99700 |
| .71391 | .67906 | 1.99700 |
| .67965 | .65804 | 1.99700 |
| .64555 | .63674 | 1.99700 |
| .61164 | .61513 | 1.99700 |
| .57793 | .59320 | 1.99700 |
| .54444 | .57093 | 1.99700 |
| .51119 | .54828 | 1.99700 |
| .47821 | .52522 | 1.99700 |
| .44553 | .50173 | 1.99700 |
| .41317 | .47779 | 1.99700 |
| .38117 | .45335 | 1.99700 |
| .34958 | .42836 | 1.99700 |
| .31845 | .40279 | 1.99700 |
| .28781 | .37660 | 1.99700 |
| .25772 | .34976 | 1.99700 |
| .22827 | .32219 | 1.99700 |
| .19956 | .29381 | 1.99700 |
| .17168 | .26459 | 1.99700 |
| .14475 | .23448 | 1.99700 |
| .11885 | .20344 | 1.99700 |
| .09411 | .17142 | 1.99700 |
| .07075 | .13834 | 1.99700 |
| .04897 | .10415 | 1.99700 |
| .02897 | .06885 | 1.99700 |
| .01096 | .03245 | 1.99700 |
| −.00481 | −.00502 | 1.99700 |
| −.01811 | −.04346 | 1.99700 |
| −.02873 | −.08275 | 1.99700 |
| −.03651 | −.12273 | 1.99700 |
| −.04131 | −.16320 | 1.99700 |
| −.04308 | −.20391 | 1.99700 |
| −.04187 | −.24461 | 1.99700 |
| −.03785 | −.28510 | 1.99700 |

TABLE I-continued

| X | Y | Z |
|---|---|---|
| −.03122 | −.32522 | 1.99700 |
| −.02226 | −.36453 | 1.99700 |
| −.01124 | −.40386 | 1.99700 |
| .00157 | −.44229 | 1.99700 |
| .01596 | −.48011 | 1.99700 |
| .03186 | −.51731 | 1.99700 |
| .04923 | −.55385 | 1.99700 |
| .06797 | −.58968 | 1.99700 |
| .08790 | −.62482 | 1.99700 |
| .10880 | −.65931 | 1.99700 |
| .13033 | −.69332 | 1.99700 |
| .15194 | −.72709 | 1.99700 |
| .17277 | −.76106 | 1.99700 |
| .19118 | −.79583 | 1.99700 |
| .20409 | −.83209 | 1.99700 |
| .20650 | −.86914 | 1.99700 |
| .19499 | −.90397 | 1.99700 |
| .23392 | −.93805 | −1.49800 |
| .18854 | −.96810 | −1.49800 |
| .12918 | −.97330 | −1.49800 |
| .06864 | −.96655 | −1.49800 |
| .00876 | −.95318 | −1.49800 |
| −.05016 | −.93540 | −1.49800 |
| −.10801 | −.91418 | −1.49800 |
| −.16462 | −.88984 | −1.49800 |
| −.21971 | −.86235 | −1.49800 |
| −.27324 | −.83174 | −1.49800 |
| −.32550 | −.79883 | −1.49800 |
| −.37616 | −.76370 | −1.49800 |
| −.42479 | −.72588 | −1.49800 |
| −.47101 | −.68522 | −1.49800 |
| −.51431 | −.64155 | −1.49800 |
| −.55418 | −.59477 | −1.49800 |
| −.62193 | .13478 | .99900 |
| −.59082 | .18878 | .99900 |
| −.55552 | .24016 | .99900 |
| −.51642 | .28870 | .99900 |
| −.47389 | .33435 | .99900 |
| −.42845 | .37727 | .99900 |
| −.38061 | .41762 | .99900 |
| −.33085 | .45564 | .99900 |
| −.27948 | .49145 | .99900 |
| −.22671 | 52526 | .99900 |
| −.17279 | .55735 | .99900 |
| −.11802 | .58804 | .99900 |
| −.06259 | .61759 | .99900 |
| −.00663 | .64615 | .99900 |
| .04981 | .67380 | .99900 |
| .10662 | .70077 | .99900 |
| .16368 | .72721 | .99900 |
| .22100 | .75309 | .99900 |
| .27854 | .77851 | .99900 |
| .33625 | .80358 | .99900 |
| .39411 | .82830 | .99900 |
| .45210 | .85273 | .99900 |
| .51019 | .87696 | .99900 |
| .56836 | .90100 | .99900 |
| .62659 | .92493 | .99900 |
| .68485 | .94875 | .99900 |
| .74316 | .97251 | .99900 |
| .80151 | .99621 | .99900 |
| .85989 | 1.01977 | .99900 |
| .91613 | 1.03012 | .99900 |
| .95854 | .99659 | .99900 |
| .95854 | .99659 | .99900 |
| .96444 | .96190 | .99900 |
| .95077 | .92966 | .99900 |
| .92036 | .90744 | .99900 |
| .88555 | .88712 | .99900 |
| .85090 | .86647 | .99900 |
| .81645 | 84544 | .99900 |
| .78227 | .82397 | .99900 |
| .74836 | .80209 | .99900 |
| .71472 | .77979 | .99900 |
| .68137 | .75704 | .99900 |
| .64834 | .73382 | .99900 |
| .61565 | .71011 | .99900 |
| .58333 | .68588 | .99900 |

TABLE I-continued

| X | Y | Z |
|---|---|---|
| .55143 | .66110 | .99900 |
| .51995 | .63576 | .99900 |
| .48895 | .60983 | .99900 |
| .45846 | .58329 | .99900 |
| .42854 | .55609 | .99900 |
| .39924 | .52821 | .99900 |
| .37058 | .49965 | .99900 |
| .34265 | .47036 | .99900 |
| .31552 | .44032 | .99900 |
| .28925 | .40949 | .99900 |
| .26392 | .37788 | .99900 |
| .23960 | .34546 | .99900 |
| .21639 | .31221 | .99900 |
| .19440 | .27813 | .99900 |
| .17373 | .24322 | .99900 |
| .15446 | .20751 | .99900 |
| .13668 | .17101 | .99900 |
| .12047 | .13377 | .99900 |
| .10597 | .09579 | .99900 |
| .09331 | .05717 | .99900 |
| .08255 | .01795 | .99900 |
| .07377 | −.02176 | .99900 |
| .06703 | −.06187 | .99900 |
| .06234 | −.10228 | .99900 |
| .05970 | −.14286 | .99900 |
| .05907 | −.18353 | .99900 |
| .06037 | −.22416 | .99900 |
| .06352 | −.26469 | .99900 |
| .06842 | −.30501 | .99900 |
| .07494 | −.34509 | .99900 |
| .08292 | −.38487 | .99900 |
| .09222 | −.42433 | .99900 |
| .10271 | −.46347 | .99900 |
| .11428 | −.50228 | .99900 |
| .12692 | −.54075 | .99900 |
| .14082 | −.57883 | .99900 |
| .15613 | −.61640 | .99900 |
| .17275 | .−.65338 | .99900 |
| .19058 | −.68976 | .99900 |
| .20946 | −.72556 | .99900 |
| .22904 | −.7608 | .99900 |
| .24876 | −.79593 | .99900 |
| .26760 | −.83114 | .99900 |
| .28354 | −.86708 | .99900 |
| .29297 | −.90427 | .99900 |
| .29136 | −.94163 | .99900 |
| .27765 | −.97660 | .99900 |
| .32153 | −1.01928 | .49900 |
| .27283 | −1.04652 | .49900 |
| .21173( | −1.04796 | .49900 |
| .15021 | −1.03760 | .49900 |
| .08969 | −1.02079 | .49900 |
| .03031 | −.99975 | .49900 |
| −.02791 | −.97547 | .49900 |
| −.08490 | −.94838 | .49900 |
| −.14042 | −.91850 | .49900 |
| −.19440 | −.88578 | .49900 |
| −.24711 | −.85090 | .49900 |
| −.29842 | −.81408 | .49900 |
| −.34808 | −.77511 | .49900 |
| −.39586 | −.73389 | .49900 |
| −.44143 | −.69029 | .49900 |
| −.48441 | −.64417 | .49900 |
| −.52440 | −.59541 | .49900 |
| −.56093 | −.54405 | .49900 |
| −.59355 | −.49019 | .49900 |
| −.62184 | −.43396 | .49900 |
| −.64543 | −.37560 | .49900 |
| −.66397 | −.31549 | .49900 |
| −.67725 | −.25405 | .49900 |
| −.68511 | −.19170 | .49900 |
| −.68748 | −.12893 | .49900 |
| −.68433 | −.06622 | .49900 |
| −.67562 | −.00402 | .49900 |
| −.66136 | .05715 | .49900 |
| −.64160 | .11677 | .49900 |
| −.61670 | .17446 | .49900 |
| −.58713 | .22983 | .49900 |

TABLE I-continued

| X | Y | Z |
|---|---|---|
| −.55311 | .28256 | .49900 |
| −.51493 | .33247 | .49900 |
| −.47311 | .37950 | .49900 |
| −.42818 | .42366 | .49900 |
| −.38065 | .46502 | .49900 |
| −.33088 | .50369 | .49900 |
| −.27918 | .53989 | .49900 |
| −.22594 | .57396 | .49900 |
| −.17154 | .60626 | .49900 |
| −.11630 | .63716 | .49900 |
| −.08040 | .66886 | .49900 |
| −.00388 | .69548 | .49900 |
| .05308 | .72331 | .49900 |
| .11033 | .75054 | .49900 |
| .16787 | .77713 | .49900 |
| .22568 | .80322 | .49900 |
| .28367 | .82893 | .49900 |
| .34182 | .85425 | .49900 |
| .40013 | .67926 | .49900 |
| .45853 | .90407 | .49900 |
| .51702 | .92868 | .49900 |
| .57557 | .95320 | .49900 |
| .63415 | .97763 | .49900 |
| .69276 | 1.00201 | .49900 |
| .75140 | 1.02636 | .49900 |
| .81008 | 1.05059 | .49900 |
| .86668 | 1.06199 | .49900 |
| .90992 | 1.02877 | .49900 |
| .90992 | 1.02877 | .49900 |
| .91619 | .99413 | .49900 |
| .90285 | .96173 | .49900 |
| .87265 | .93916 | .49900 |
| .83810 | .91828 | .49900 |
| .80382 | .89692 | .49900 |
| .76985 | .87502 | .49900 |
| .73628 | .85253 | .49900 |
| .70310 | .82946 | .49900 |
| .67032 | .80582 | .49900 |
| .63797 | .78156 | .49900 |
| .60611 | .75666 | .49900 |
| .57476 | .73111 | .49900 |
| .54396 | .70488 | .49900 |
| .51378 | .67794 | .49900 |
| .48424 | .65028 | .49900 |
| .45539 | .62188 | .49900 |
| .42729 | .59272 | .49900 |
| .40002 | .56278 | .49900 |
| .37363 | .53204 | .49900 |
| .34816 | .50052 | .49900 |
| .32369 | .46820 | .49900 |
| .30031 | .43507 | .49900 |
| .27810 | .40114 | .49900 |
| .25712 | .36642 | .49900 |
| .23744 | .33093 | .49900 |
| .21913 | .29470 | .49900 |
| .20229 | .25777 | .49900 |
| .18697 | .22017 | .49900 |
| .17322 | .18197 | .49900 |
| .16110 | .14321 | .49900 |
| .15062 | .10395 | .49900 |
| .14163 | .06428 | .49900 |
| .13478 | .02427 | .49900 |
| .12943 | −.01599 | .49900 |
| .12578 | −.05643 | .49900 |
| .12377 | −.09899 | .49900 |
| .12338 | −.13759 | .49900 |
| .12451 | −.17815 | .49900 |
| .12709 | −.21864 | .49900 |
| .13102 | −.25901 | .49900 |
| .13624 | −.29923 | .49900 |
| .14267 | −.33926 | .49900 |
| .15021 | −.37908 | .49900 |
| .15876 | −.41866 | .49900 |
| .16820 | −.45802 | .49900 |
| .17842 | −.49716 | .49900 |
| .18933 | −.53608 | .49900 |
| .20093 | −.57481 | .49900 |
| .21342 | −.61333 | .49900 |

TABLE I-continued

| X | Y | Z |
|---|---|---|
| .22704 | −.65149 | .49900 |
| .24176 | −.68923 | .49900 |
| .25750 | −.72653 | .49900 |
| .27413 | −.76340 | .49900 |
| .29133 | −.79992 | .49900 |
| .30857 | −.83624 | .49900 |
| .32474 | −.87271 | .49900 |
| .33751 | −.90976 | .49900 |
| .34304 | −.94760 | .49900 |
| .337541 | −.98483 | .49900 |
| .32153 | −1.01928 | .49900 |
| .37276 | −1.06251 | .00000 |
| .32239 | −1.08257 | .00000 |
| .26254 | −1.07770 | .00000 |
| .20337 | −1.06192 | .00000 |
| .14561 | −1.04044 | .00000 |
| .08918 | −1.01526 | .00000 |
| .03400 | −.98728 | .00000 |
| −.01995 | −.95694 | .00000 |
| −.07254 | −.92432 | .00000 |
| −.12367 | −.88942 | .00000 |
| −.17346 | −.85256 | .00000 |
| −.22193 | −.81397 | .00000 |
| −.26897 | −.77368 | .00000 |
| −.31437 | −.73159 | .00000 |
| −.35783 | −.68756 | .00000 |
| −.39908 | −.64145 | .00000 |
| −.43779 | −.59315 | .00000 |
| −.47360 | −.54270 | .00000 |
| −.50613 | −.49014 | .00000 |
| −.53509 | −.43555 | .00000 |
| −.56022 | −.37909 | .00000 |
| −.58127 | −.32103 | .00000 |
| −.59812 | −.26163 | .00000 |
| −.61067 | −.20119 | −.00000 |
| −.61884 | −.14003 | −.00000 |
| −.62260 | −.07844 | .00000 |
| −.62188 | −.01674 | .00000 |
| −.61650 | .04469 | .00000 |
| −.60612 | .10550 | .00000 |
| −.59066 | .16516 | .00000 |
| −.57012 | .22304 | .00000 |
| −.54431 | .27867 | −.00000 |
| −.51325 | .33169 | .00000 |
| −.47749 | .38176 | .00000 |
| −.43758 | .42860 | .00000 |
| −.39403 | .47209 | .00000 |
| −.34748 | .51261 | .00000 |
| −.29867 | .55067 | .00000 |
| −.24818 | .58662 | .00000 |
| −.19646 | .62085 | .00000 |
| −.14386 | .65377 | .00000 |
| −.09056 | .68553 | .00000 |
| −.03658 | .71618 | .00000 |
| .01795 | .74596 | .00000 |
| .07285 | .77503 | .00000 |
| .12814 | .80338 | .00000 |
| .18376 | .83111 | .00000 |
| .23964 | .85834 | .00000 |
| .29576 | .88507 | .00000 |
| .35210 | .91138 | .00000 |
| .40860 | .937331 | −.00000 |
| .46527 | .96296 | .00000 |
| .52205 | .98833 | −.00000 |
| .57895 | 1.01344 | .00000 |
| .63596 | 1.03834 | −.00000 |
| .69305 | 1.06303 | .00000 |
| .75025 | 1.08745 | .00000 |
| .80556 | 1.09824 | .00000 |
| .54807 | 1.06574 | .00000 |
| .84807 | 1.06574 | .00000 |
| .85462 | 1.03081 | −.00000 |
| .84110 | .99807 | −.00000 |
| .81055 | .97515 | .00000 |
| .77585 | .95347 | .00000 |
| .74167 | .93111 | .00000 |
| .70797 | .90799 | .00000 |
| .67482 | .88406 | .00000 |

TABLE I-continued

| X | Y | Z |
|---|---|---|
| .64226 | .85936 | .00000 |
| .61031 | .83385 | .00000 |
| .57903 | .80750 | .00000 |
| .54848 | .78029 | .00000 |
| .51872 | .75221 | .00000 |
| .48981 | .72323 | .00000 |
| .46181 | .69337 | .00000 |
| .43479 | .66260 | .00000 |
| .40881 | .63095 | .00000 |
| .38390 | .59842 | .00000 |
| .36016 | .56504 | .00000 |
| .33764 | .53082 | .00000 |
| .31638 | .49579 | .00000 |
| .29642 | .45999 | .00000 |
| .27782 | .42346 | .00000 |
| .26063 | .38625 | .00000 |
| .24489 | .34840 | .00000 |
| .23063 | .30997 | .00000 |
| .21788, | .27100 | .00000 |
| .20666 | .23156 | .00000 |
| .19701 | .19172 | .00000 |
| .18894 | 15153 | .00000 |
| .18246 | .11105 | .00000 |
| .17757 | .07033 | .00000 |
| .17427 | .02945 | .00000 |
| .17254 | −.01152 | .00000 |
| .17236 | −.05251 | .00000 |
| .17370 | −.09346 | .00000 |
| .17649 | −.13433 | .00000 |
| .18068 | −.17509 | .00000 |
| .18622 | −.21567 | .00000 |
| .19301 | −.25605 | .00000 |
| .20096 | −.29620 | .00000 |
| .20998 | −.33611 | .00000 |
| .21996 | −.37578 | .00000 |
| .23079 | −.41521 | .00000 |
| .24234 | −.45439 | .00000 |
| .25451 | −.49336 | .00000 |
| .26713 | −.53215 | .00000 |
| .28006 | −.57079 | .00000 |
| .29319 | −.60934 | .00000 |
| .30646 | −.64783 | .00000 |
| .31994 | −.68630 | .00000 |
| .33383 | −.72465 | .00000 |
| .34805 | −.76282 | .00000 |
| .36237 | −.80090 | .00000 |
| .37647 | −.83897 | −.00000 |
| .38968 | −.87715 | .00000 |
| .40070 | −.91566 | .00000 |
| .40704 | −.95446 | .00000 |
| .40506 | −.99296, | .00000 |
| .39283 | −1.02948, | .00000 |

Figure 5:
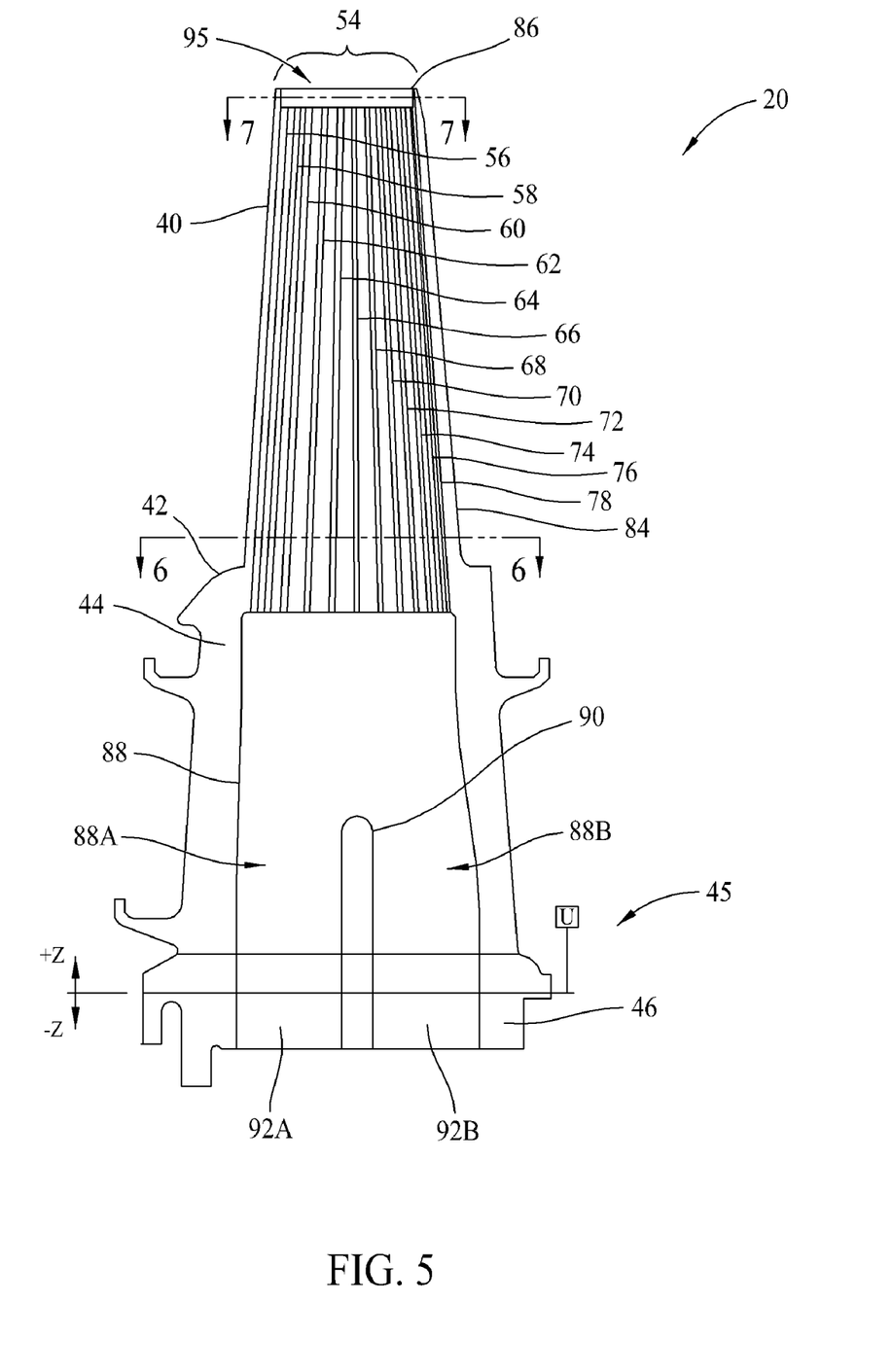
FIG. 5 is a cross-sectional view of the turbine bucket shown in FIG. 2

FIG. 5 is a front cross-sectional view of turbine bucket 20. As shown in FIG. 5, bucket 20 includes a plurality of cooling fluid medium passages 54, which may also be referred to as cooling passages. In an exemplary embodiment, the cooling fluid medium is air. Alternatively, any cooling fluid medium may be used that facilitates cooling of turbine bucket 20 as described herein. In the exemplary embodiment, the plurality of cooling passages 54 include a first cooling passage 56, a second cooling passage 58, a third cooling passage 60, a fourth cooling passage 62, a fifth cooling passage 64, a sixth cooling passage 66, a seventh cooling passage 68, an eighth cooling passage 70, a ninth cooling passage 72, a tenth cooling passage 74, an eleventh cooling passage 76, and a twelfth cooling passage 78. To enhance the cooling of airfoil 40, passages 54 extend through airfoil 40 from a root portion 84 of airfoil 40 to a tip portion 86 of airfoil 40. The passages 54 extend substantially linearly through the compound curved airfoil 40 and continue through the platform 42 into a cavity 88 defined in shank 44.

Cavity 88 is bifurcated into a pair of forward and aft cavities 88A and 88B, respectively, with a structural rib 90 extending between cavities 88A and 88B. Cavities 88A and 88B extend through shank 44 and into corresponding cavities 92A and 92B in dovetail 46. Cavities 92A and 92B extend through the radial inner end 45 of shank 44 and through dovetail 46. Consequently, it will be appreciated that a cooling medium, for example, air, may be channeled into dovetail cavities 92A and 92B and into cavities 88A and 88B for delivery into passages 54. In the exemplary embodiment, wheel 14 to which bucket 20 is coupled, includes a single plenum (not shown) which extends in flow communication into dovetail cavities 92A and 92B when dovetail 46 is secured to wheel 14. Consequently, as wheel 14 rotates, cooling medium is supplied from the single plenum in the wheel 14 to cavities 88A, 88B, 92A, and 92B and the dovetail 46 for flow radially outwardly through passages 54 prior to being discharged through cooling hole exit locations 95 defined in the tip portion 86 of airfoil 40.

Turbines are designed to operate at a predetermined temperature that provides a desired performance and efficiency. Typically, newer turbines are designed to operate at a higher temperature than older turbines and newer turbine components are designed to withstand the higher temperatures. To withstand higher temperatures, the shape of an airfoil may be changed and/or the material the bucket is constructed from may be changed. In another example, buckets are provided with larger cooling passages to maintain suitable temperatures throughout the airfoil. However, diverting a larger amount of air from the compressor and into the cooling passages may lower the efficiency of the turbine. Changing the amount of air diverted from the compressor and into the cooling passages may also trigger government regulatory requirements and force a turbine operator to fulfill reporting requirements and/or take other actions. Therefore, when replacing worn or damaged buckets, it is not always necessary or beneficial to replace the bucket with a bucket designed for use in a new, higher temperature turbine. When replacing a worn or damaged bucket, it is beneficial to maintain the supply conditions, bucket life expectancy, and the repair strategy of the original bucket. This includes maintaining a substantially similar level of blade cooling as was previously present. However, it is also beneficial for a replacement bucket to have a modified shape and material if that shape and material improves performance of the turbine.

Figure 6:
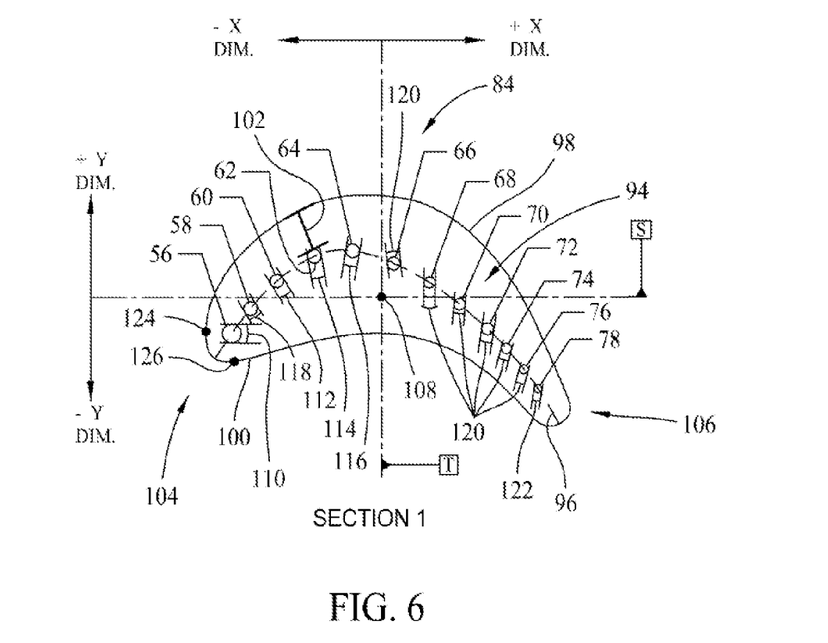
FIG. 6 is a cross-sectional view of the turbine bucket shown in FIG. 2 taken along line 6-6.
Figure 7:
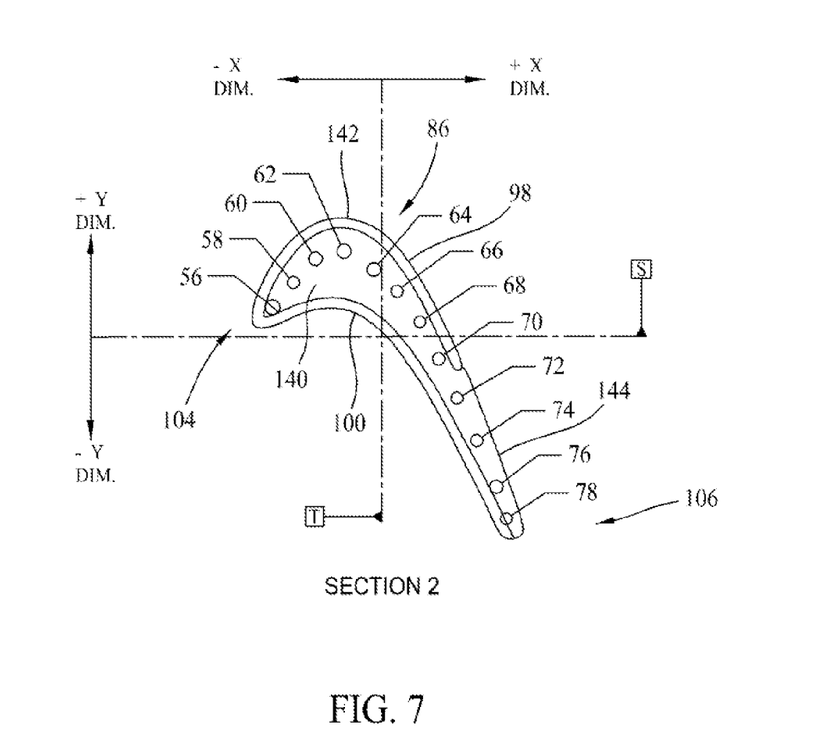
FIG. 7 is a cross-sectional view of the turbine bucket shown in FIG. 2 and taken along line 7-7.

As described above, FIG. 5 is a front cross-sectional view of turbine bucket 20 and illustrates an exemplary orientation of cooling passages 54. FIG. 6 is a cross-sectional view of airfoil 40 taken along line 6-6. FIG. 7 is a cross-sectional view of airfoil 40 taken along line 7-7. The exemplary orientation of cooling passages 54 facilitates airfoil 40 maintaining and/or improving turbine performance and exemplary bucket life.

To facilitate the replacement of an original twelve-hole stage 1 bucket, with bucket 20 described herein, air passages 54 in the exemplary embodiment extend in a camber line pattern 94 of airfoil 40. More specifically, in the exemplary embodiment, the camber line pattern 94 extends generally along a mean camber line 96 (shown in FIG. 6) of airfoil 40. Mean camber line 96 is equidistant at all points between a suction side surface 98 (shown in FIG. 6) and a pressure side surface 100 (shown in FIG. 6) of airfoil 40. In the exemplary embodiment, a distance 102 between edges of air passages 54 and either suction side surface 98 and/or pressure side surface 100 of airfoil 40 is no less than about 0.050 inches. Alternatively, the locations of air passages 54 may be adjusted in airfoil 40 to enable passage diameter adjustments without violating minimum wall thickness requirements. Moreover, in alternative embodiments, the camber line pattern 94 may shift slightly or vary from mean camber line 96 to facilitate effective cooling of the airfoil.

As shown, the plurality of cooling passages 54 includes first 56, second 58, third 60, fourth 62, fifth 64, sixth 66, seventh 68, eighth 70, ninth 72, tenth 74, eleventh 76, and twelfth 78 cooling passages, that each extend through the airfoil section 40. For reference, first cooling passage 56 is positioned closest to a leading edge 104 and twelfth cooling passage 78 is positioned closest to a trailing edge 106 of airfoil 40. With reference to FIGS. 6 and 7 and to Table II below, airfoil cooling flow is redistributed towards a center 108 of airfoil 40 rather than towards leading edge 104. A diameter 110 of first passage 56 is reduced in comparison to known cooling hole patterns. For example, the diameter 110 of cooling passage 56 may be reduced from 0.118 inches to 0.100 inches. Moreover, in the exemplary embodiment, the diameters 112, 114, and 116 of the third 60, fourth 62, and fifth 64 cooling passages are increased in comparison to known cooling hole patterns from 0.064 inches to 0.075 inches. In the exemplary embodiment, the first air passage 56 has diameter 110 of about 0.100 inches with a dimensional tolerance of about ±0.005 inches, second air passage 58 has a diameter 118 of about 0.064 inches with a dimensional tolerance of about ±0.005 inches, and the third 60, fourth 62, and fifth 64 air passages each have diameters 112, 114, and 116 of about 0.075 inches with a dimensional tolerance of about ±0.005 inches. Moreover, the sixth 66, seventh 68, eighth 70, ninth 72, tenth 74, and eleventh 76 air passages each have a diameter 120 of about 0.064 inches with a dimensional tolerance of about ±0.005 inches. In addition, the twelfth air passage 78 has a diameter 122 of about 0.045 inches with a dimensional tolerance of about ±0.005 inches.

The relative locations of cooling passages 54 are also subject to tolerances. For example, first air passage 56 has a location tolerance of about ±0.010 inches relative to two points 124 and 126 defined on leading edge 104 of airfoil 40 closest to first air passage 56. Similarly, in the exemplary embodiment, second 58, third 60, fourth 62, fifth 64, sixth 66, seventh 68, eighth 70, ninth 72, tenth 74, eleventh 76, and twelfth 78 air passages each have a location tolerance of about 0.040 inches relative to the airfoil profile at Section 2 (i.e., the cross-sectional profile of airfoil 40 taken along line 7-7) and about ±0.045 inches relative to the airfoil profile at Section 1 (i.e., the cross-sectional profile of airfoil 40 taken along line 6-6).

Because cavities 92A, 92B, 88A and 88B extend through the shank section 44 and are relative to the minimum neck width at the dovetail section 46, cavities 88A and 88B and airfoil cooling passages 54 intersection points are defined at shank-airfoil intersection 42, as shown in Table II. Additionally, airfoil section 40 cooling hole exit locations 95 may be relocated to facilitate diameter maximization, without violating minimum wall thickness requirements on one side of airfoil 40, while leaving excessive margin on the other side of airfoil 40. The exit locations 95 are defined at the shank-airfoil intersection 42 and at the tip 86 of the airfoil section 40.

Table II provides exemplary cooling passage locations and hole diameters within turbine bucket 20. Locations and diameters are provided in inches, and also provided in millimeters (e.g., the hole diameter from section 1 to section 2 of hole number 1 is 0.100 inches or 2.54 millimeters). In the exemplary embodiment, in airfoil section 40, from airfoil section cooling hole exit location 95 to the shank-airfoil intersection 42, the cooling hole diameter of hole 1 is 0.100 inches, of holes 2 and 6-11 is 0.064 inches, of holes 3-5 is 0.075 inches, and of hole 12 is 0.045 inches with a dimensional tolerance of about ±0.005 inches.

TABLE II

| HOLE | HOLE DIA ±.005 [0.12] FROM SECT. 1 TO SECT. 2 | Section 1 | | Section 2 | |
|---|---|---|---|---|---|
| | | X | Y | X | Y |
| 1 | .100 [2.54] | −.598 [15.19] | .183 [4.65] | −.921 [23.40] | −.263 [6.68] |
| 2 | .064 [1.63] | −.476 [12.09] | .336 [8.53] | −.805 [20.45] | −.084 [2.13] |
| 3 | .075 [1.90] | −.358 [9.09] | .470 [11.94] | −.635 [16.13] | .113 [2.87] |
| 4 | .075 [1.90] | −.201 [5.11] | .509 [12.93] | −.406 [10.31] | .273 [6.93] |
| 5 | .075 [1.90] | −.042 [10.21] | .396 [10.06] | −.168 [4.27] | .322 [8.18] |
| 6 | .064 [1.63] | .082 [2.08] | .266 [6.76] | .082 [2.08] | .230 [5.84] |
| 7 | .064 [1.63] | .207 [5.26] | .085 [2.16] | .316 [8.03] | .110 [2.79] |
| 8 | .064 [1.63] | .310 [7.87] | −.133 [3.38] | .499 [12.67] | −.051 [1.30] |
| 9 | .064 [1.63] | .408 [10.36] | −.362 [9.19] | .668 [16.97] | −.222 [5.64] |
| 10 | .064 [1.63] | .519 [13.18] | −.615 [15.62] | .791 [20.09] | −.373 [9.47] |
| 11 | .064 [1.63] | .629 [15.98] | −.885 [22.48] | .906 [23.01] | −.518 [13.16] |
| 12 | .045 [1.14] | .688 [17.48] | −1.068 [27.13] | .986 [25.04] | −.661 [16.79] |

With reference to FIGS. 6 and 7, the origin of the X, Y, Z Cartesian coordinate system referenced in Table II used to locate the cooling passages is the intersection of the S, T, and U datum planes. These datum planes are identified in the drawings. The U datum extends through the shank center holes (shown in FIG. 2). The distance X to the center of the holes is the distance from datum T, the distance Y is the distance from datum S, while the distance Z is the distance from datum U. Thus, the origin of the coordinate system lies at the intersection of datum S, T and U. In the exemplary embodiment, during Shaped Tube Electrochemical Machining (STEM) of the cooling holes, the bucket is held at the shank center holes.

In the exemplary embodiment, the tip portion 86 of airfoil 40 includes a tip recess 140 defined within surrounding walls 142, which extend radially outwardly from tip portion 86 of airfoil 40. The base of tip recess 140 receives the exit hole locations 95 (shown in FIG. 5) of cooling passages 54. As illustrated in FIGS. 6-7, airfoil 40 has a compound curvature having suction side 98 and pressure side 100. On the suction side 98, and adjacent trailing edge 106, a slot or opening 144 is defined that forms an interruption of the surrounding suction side wall 142, enabling the cooling medium to be discharged from within tip recess 140 into the hot gas flow stream. It will be appreciated that the tip portion 86 of airfoil 40 lies in close proximity to a radially outer surrounding stationary shroud (not shown in FIG. 6). The slot 144 into the tip recess 140 is located on the suction side 98, which is at a lower pressure and therefore a more desirable location than pressure side 100. Additionally, by forming the slot 140, a backpressure otherwise caused by the shroud (not shown in FIG. 6) is facilitated to be prevented.

The above described embodiments of a turbine bucket provide a cost-effective and reliable replacement for currently-used stage 1 buckets. The above described buckets maintain original supply conditions and similar repair strategies as the buckets being replaced while maintaining and/or improving turbine performance and bucket life.

Exemplary embodiments of a bucket for a turbine and a turbine engine are described above in detail. The air cooled bucket and turbine engine are not limited to the specific embodiments described herein, but rather, components may be utilized independently and separately from other components described herein.

While the invention has been described in terms of various specific embodiments, it will be recognized that the invention can be practiced with modification within the spirit and scope of the claims.

What is claimed is:

1. A bucket for a turbine, said bucket comprising:
an airfoil having a root portion, a tip portion, an airfoil shape, and a nominal profile substantially in accordance with Cartesian coordinate values of X, Y, and Z set forth in Table I, wherein Z is a distance from a platform on which said airfoil extends outwardly from, and X and Y are coordinates defining the profile at each distance Z from said platform; and
a plurality of cooling passages extending between said root portion and said tip portion of said airfoil, each of said cooling passages exiting at said tip portion, said plurality of cooling passages positioned in a camber line pattern.

2. A bucket in accordance with claim 1 wherein said plurality of cooling passages are positioned at said tip and root portions of said airfoil in accordance with X, Y Cartesian coordinate values set forth in Table II.

3. A bucket in accordance with claim 1 wherein said plurality of cooling passages comprises at least twelve cooling passages that are aligned substantially parallel to each other.

4. A bucket in accordance with claim 3 wherein a first of said plurality of cooling passages has a diameter of about 0.100 inches±0.005 inches, a second, sixth, seventh, eighth, ninth, tenth, and an eleventh cooling passage have a diameter of about 0.064 inches±0.005 inches, a third, a fourth, and a fifth cooling passage have a diameter of about 0.075 inches±0.005 inches, and a twelfth cooling passage has a diameter of about 0.045 inches±0.005 inches.

5. A bucket in accordance with claim 1 wherein said plurality of cooling passages are oriented to facilitate improving cooling effectiveness and a useful life of said airfoil, said plurality of cooling passages are configured to facilitate increasing bulk and local creep margins throughout said airfoil.

6. A bucket in accordance with claim 1 wherein said plurality of cooling passages facilitate maintaining a desired airfoil temperature within said airfoil with a predetermined air flow through said plurality of cooling passages, said predetermined air flow determined to maximize turbine efficiency.

7. A bucket in accordance with claim 1 wherein manufacturing tolerances of said airfoil are about ±0.011 inches.

8. A bucket in accordance with claim 1 wherein said airfoil further comprises a coating, extending at least partially over each side of said airfoil.

9. A bucket in accordance with claim 1 further comprising a dovetail portion and a shank portion, said dovetail portion and said shank portion define a cavity that is in flow communication with said plurality of cooling passages.

10. A bucket in accordance with claim 9 wherein said shank, said platform, and said airfoil are integrally cast, said plurality of cooling passages extend from said airfoil tip portion to said airfoil root portion such that each of said cooling passages is adjacent each of a pressure side and a suction side of said airfoil.

11. A bucket in accordance with claim 1 wherein said bucket is cast from a nickel-based superalloy.

12. A gas turbine engine comprising:
a rotor comprising at least one rotor wheel; and
a plurality of buckets radially extending from said at least one rotor wheel, each of said plurality of buckets comprises an airfoil and a plurality of cooling passages, said airfoil has a nominal profile substantially in accordance with Cartesian coordinate values of X, Y, and Z set forth in Table I wherein Z is a distance from a platform from which said airfoil extends outwardly therefrom, X and Y are coordinates defining the profile at each distance Z from said platform, said plurality of cooling passages extend between a root portion and a tip portion of each airfoil, said plurality of cooling passages positioned in a camber line pattern.

13. A gas turbine engine in accordance with claim 12 wherein said plurality of cooling passages are positioned at said tip and root portions of said airfoil in accordance with X, Y Cartesian coordinate values set forth in Table II.

14. A gas turbine engine in accordance with claim 12 wherein said plurality of cooling passages comprises at least twelve cooling passages that are aligned substantially parallel to each other.

15. A gas turbine engine in accordance with claim 14 wherein a first of said plurality of cooling passages has a diameter of about 0.100 inches±0.005 inches, a second, a sixth, a seventh, an eighth, a ninth, a tenth, and an eleventh cooling passage of said plurality of cooling passages have a diameter of about 0.064 inches±0.005 inches, a third, a fourth, and a fifth cooling passage of said plurality of cooling passages have a diameter of about 0.075 inches±0.005 inches, and a twelfth cooling passage of said plurality of cooling passages has a diameter of about 0.045 inches±0.005 inches.

16. A gas turbine engine in accordance with claim 12 wherein said cooling passages are oriented to facilitate improving cooling effectiveness and a useful life of said airfoil, said plurality of cooling passages are configured to facilitate increasing bulk and local creep margins throughout said airfoil.

17. A gas turbine engine in accordance with claim 12 wherein said plurality of cooling passages facilitate maintaining a desired airfoil temperature within said airfoil with a predetermined air flow through said plurality of cooling passages, said predetermined air flow determined to maximize turbine efficiency.

18. A gas turbine engine in accordance with claim 12 wherein said plurality of buckets further comprise a dovetail portion and a shank portion, said dovetail portion and said shank portion define a cavity that is in flow communication with said plurality of cooling passages.

19. A multi-stage gas turbine engine in accordance with claim 12 wherein said bucket is cast from a nickel-based superalloy.

* * * * *